(12) United States Patent
Kurita et al.

(10) Patent No.: US 6,757,084 B2
(45) Date of Patent: *Jun. 29, 2004

(54) IMAGE READING APPARATUS AND CONTROL METHOD THEREOF

(75) Inventors: Mitsuru Kurita, Yokohama (JP); Hiroshi Sato, Kawasaki (JP); Koji Arai, Ohmiya (JP); Koichi Ishimoto, Yokohama (JP); Taro Ikeda, Numazu (JP); Takashi Sugiura, Mishima (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 4 days.

(21) Appl. No.: 09/377,562

(22) Filed: Aug. 19, 1999

(65) Prior Publication Data

US 2003/0197904 A1 Oct. 23, 2003

(30) Foreign Application Priority Data

| Aug. 20, 1998 | (JP) | ............................................ 10-234120 |
| Aug. 20, 1998 | (JP) | ............................................ 10-234121 |
| Aug. 20, 1998 | (JP) | ............................................ 10-234122 |
| Aug. 20, 1998 | (JP) | ............................................ 10-234123 |
| Aug. 4, 1999 | (JP) | ............................................ 11-221454 |
| Aug. 4, 1999 | (JP) | ............................................ 11-221455 |
| Aug. 4, 1999 | (JP) | ............................................ 11-221456 |

(51) Int. Cl.$^7$ .................................................. H04N 1/46
(52) U.S. Cl. ...................................... 358/509; 358/504
(58) Field of Search .............................. 358/475, 509, 358/484, 514, 513, 512, 406, 504; 250/234–236, 208.1; 362/84, 230, 231, 260; 315/169.3; 313/485, 486, 487; 252/301.4

(56) References Cited

U.S. PATENT DOCUMENTS

| 4,642,679 A | | 2/1987 | Nagano | ....................... 358/509 |
| 5,278,674 A | | 1/1994 | Webb et al. | ................. 358/475 |
| 5,450,215 A | * | 9/1995 | Iwama | ........................ 358/509 |
| 5,920,408 A | * | 7/1999 | Nagano | ....................... 358/509 |

FOREIGN PATENT DOCUMENTS

| EP | 0 158 962 | | 10/1985 |
| EP | 000973327 A2 | | 1/2002 |
| JP | 02000050017 A | * | 2/2000 |
| JP | 02000050018 A | * | 2/2000 |
| JP | 02000069225 A | * | 3/2000 |
| JP | 02000069227 A | * | 3/2000 |
| JP | 02000069232 A | * | 3/2000 |
| JP | 02000209399 A | * | 7/2000 |

OTHER PUBLICATIONS

Derwent Account No. 2000–263805, "Image reader has pulse width modulator to reduce central deviation of each color based on amount of light emitted from fluorescent lamp", Derwent–Week 200023 (Mar. 3, 2000).

Derwent Account No. 2001–251055, "Image reader has determination unit which updates control value used to center light emitted from fluorescent lamp around preset position." Derwent–Week 200126 (Feb. 16, 2001).

U.S. patent application No. 09/318,994 filed May 26, 1999 entitled "IMAGE READING APPARATUS AND DIMMING CONTROL METHOD AND LINE SENSOR LAYOUT METHOD THEREOF".

* cited by examiner

*Primary Examiner*—Cheukfan Lee
(74) *Attorney, Agent, or Firm*—Morgan & Finnegan, L.L.P.

(57) ABSTRACT

To control a light emitted from a fluorescent lamp having phosphors with different afterglow properties for different colors, a center of a lighting control signal for controlling the lighting of the fluorescent lamp is controlled to constantly align with the center of a Hsync period so that despite the variation of the lighting time of the fluorescent lamp, a barycenter of the quantity of light from the fluorescent lamp in the Hsync period almost aligns with the center of the Hsync period to reduce the offset of the barycenter.

60 Claims, 22 Drawing Sheets

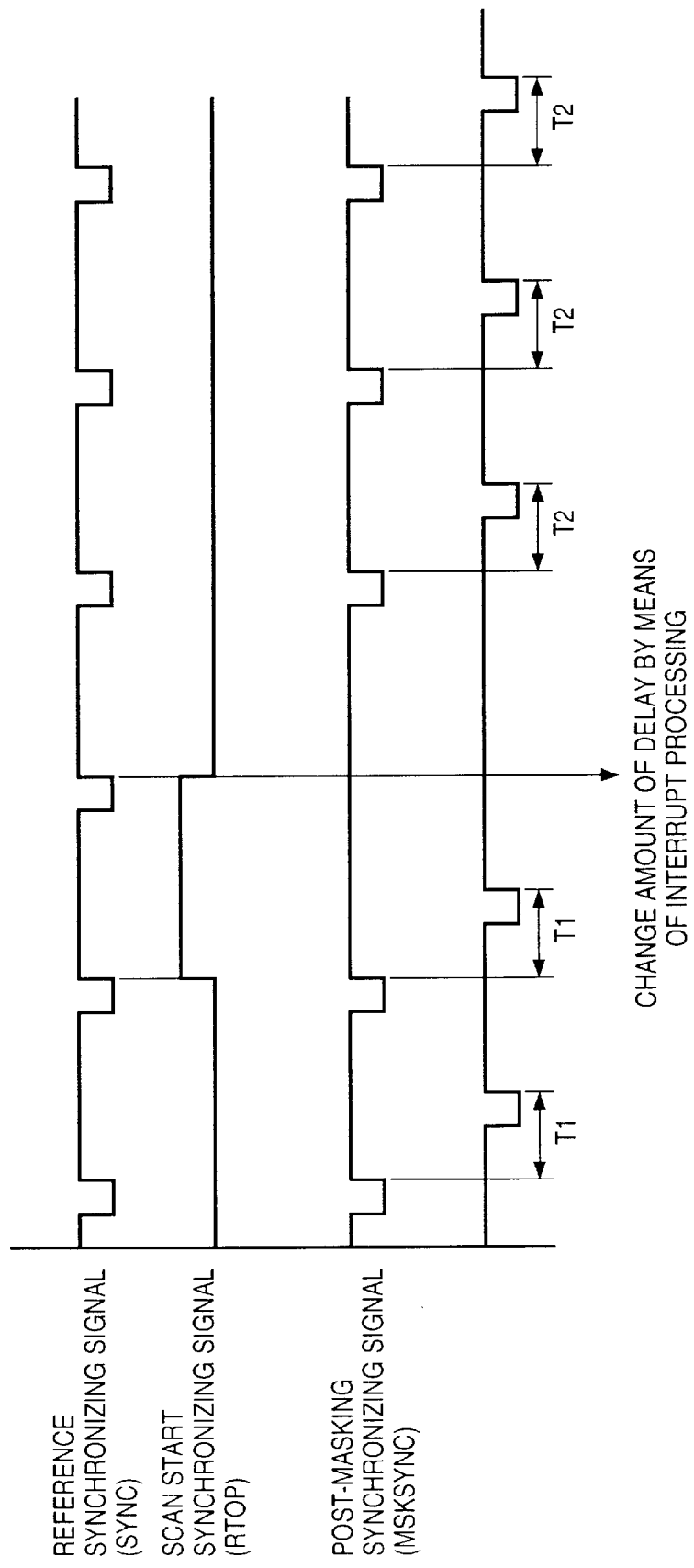

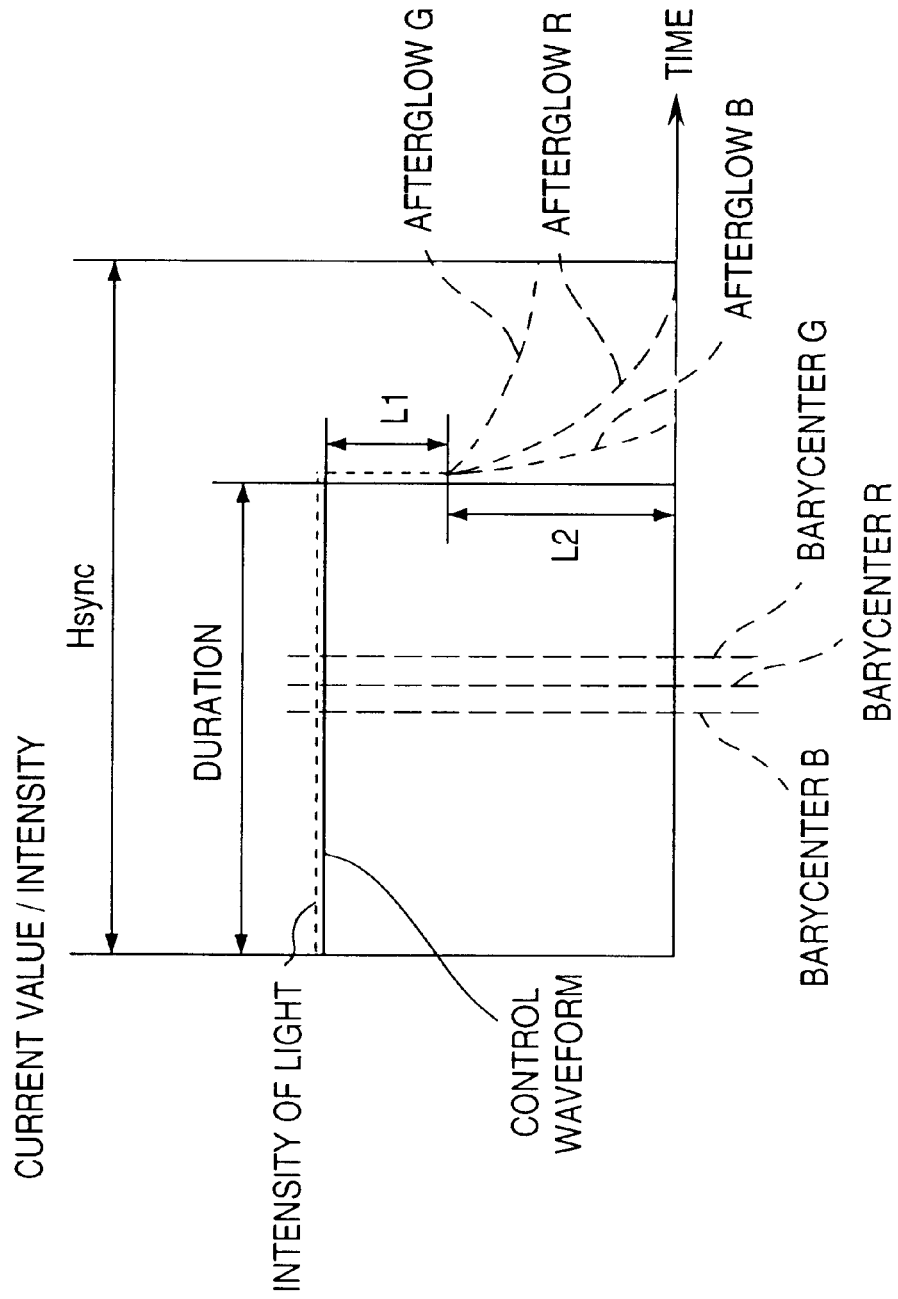

IMAGE READING APPARATUS AND CONTROL METHOD THEREOF

BACKGROUND OF THE INVENTION

The present invention relates to an image reading apparatus and method for forming an image of an original on solid-state image sensing devices via an image-forming optical system to read the image.

Various image reading apparatuses that form an image of an original on a plurality of line sensors (solid-state image sensing devices such as CCDs) via an image-forming optical system and that digitally read a black-and-white or colored image based on output signals from the line sensors have been proposed.

FIG. 21 is a schematic view of the integral part of an optical system in a conventional colored-image reading apparatus as seen from a lateral side.

In this figure, 100 is a platen glass on which an original to be read is placed, 101 is a bar-shaped light source for illuminating an original, and 102 is a reflector for improving the illumination efficiency.

An image of an original (not shown) illuminated by the bar-shaped light source 101 and the reflector 102 is guided to an image-forming optical system 104 via mirrors 103-*a*, 103-*b*, and 103-*c*. The image-forming optical system 104 forms the image of the original on solid-state image sensing devices 105.

Together with the light source 101 and the reflector 102, the mirror 103-*a* moves at a speed (v) in a sub-scanning direction A relative to the original, and in synchronization with the mirror 103-*a*, the mirrors 103-*b* and 103-*c* also move in the sub-scanning direction A at a speed v/2. The line sensor of the solid-state image sensing devices 105 is arranged in a main scanning direction, so a combination of this arrangement with the relative shift of each of the above sections in the sub-scanning direction enables the image of the original to be two-dimensionally scanned and read.

In such a configuration, the image formed on the solid-state image sensing devices 105 is converted into an electric signal and used in various apparatuses. For example, it is sent to an output apparatus (not shown) for printout or to a storage apparatus where it is stored as input image information.

The light source for an image reading apparatus configured in this manner includes a halogen lamp, a fluorescent lamp, and a xenon lamp. Of these lamps, the halogen lamp has been typically used as the light source for such an image reading apparatus. Although the halogen lamp emits light of a high luminance, there are problems in which the temperature of the apparatus significantly increases with the increasing temperature of the lamp and this lamp requires 200- to 300-W power, thereby increasing the power consumption of the entire apparatus.

In order to avoid such problems, the recent trend is to develop fluorescent and xenon lamps of a high luminance as light sources for image reading apparatuses.

Most fluorescent and xenon lamps comprise a bar-shaped hollow tube with a small amount of mercury powders and several Torrs of argon (Ar), krypton (Kr), or xenon (Xe) sealed therein wherein various phosphors are coated on the inner wall of the tube and wherein electrodes are placed at the respective sides of the tube to seal it.

Ultraviolet rays emitted from mercury or various gases due to discharge from the electrodes excite the phosphors coated on the inside of the tube to radiate visible radiation depending on the emission property of the phosphors.

In addition, the phosphors are selected depending on a spectral distribution required for the light source.

In particular, a colored-image reading apparatus requires a light source radiating light of a wide wavelength range including red (R), green (G), and blue (B), and an approach for mixing phosphors of a plurality of colors together and coating the mixture on the inner wall of the tube is used if a light source of a particularly high luminance is required.

In addition, if the quantity of light from a fluorescent or xenon lamp is to be controlled, then instead of controlling the lighting voltage as in the halogen lamp, the pulse width modulation method for controlling the lighting time using a specified current is generally used to control the quantity of light. This is because the fluorescent or xenon lamp is characterized by lighting when current supplied to the lamp exceeds a fixed value and because the method for controlling the quantity of light by varying the magnitude of the current cannot provide a wide control range for the quantity of light.

On the other hand, for image reading apparatuses using a fluorescent or xenon lamp, an approach that omits the above light quantity control and that enables the variable setting of the gain of an amplifier for electrically amplifying output signals from the solid-state image sensing devices so as to correspond to a decrease in the quantity of light over time so that appropriate signal output levels can be obtained by varying the gain according to the decrease in the quantity of light has been proposed. In such a method, however, the gain value may vary the S/N ratio of read signals.

The above conventional examples, however, have the following disadvantages.

In an image reading apparatus using a light source with phosphors acting as a light emitting source as in the fluorescent or xenon lamp, a method of controlling the quantity of light by controlling the duration of a pulse signal corresponding to the lighting time while maintaining a current flowing through the lamp at a specified value.

FIG. 22 shows a waveform of a control signal for controlling the quantity of light from a light source. The horizontal axis in this figure represents time, and the vertical axis represents the value of a current for controlling the quantity of light from the light source and the intensity of light from a fluorescent lamp. In FIG. 22, calibration has been carried out so that the maximum current value and the corresponding intensity of light emitted from the fluorescent lamp are shown at the same point in the vertical-axis direction on the graph.

The Hsync interval on the horizontal axis indicates the time corresponding to one accumulation time period of the solid-state image sensing device, and during this time, charges corresponding to the quantity of light which incidents on a light receiving section of the solid-state image sensing device are accumulated.

For normal pulse width control, a control pulse signal having a predetermined-duration is output once per accumulation time period in synchronization with the leading or trailing edge of a trigger signal indicating the start of the accumulation time period. In this manner, by controlling the quantity of light in synchronization with the trigger signal indicating the start of an accumulation time period, noise in an image signal that results from beat caused by the interference between the accumulation time period and the pulse width control for controlling the quantity of light is conventionally removed.

On the other hand, in a fluorescent or xenon lamp using phosphors as a light source, by coating phosphors of a plurality of colors, it is often used as a white light source having a spectral distribution of a wide wavelength range covering the overall visible radiation range in an image reading apparatus for reading color information.

The use of such a white light source may pose a problem due to the difference in afterglow property among the phosphors. The afterglow property is generally an exponentially decreasing property that is determined by the time during which the phosphors excited by ultraviolet rays remain in a high energy state.

This phenomenon indicates that light emitted from the phosphors may remain despite the instantaneous interruption of a current controlling the emission of light from the light source. Attenuation time T that is the time from the start of attenuation of the intensity of light until it reaches 1/e of the intensity is expressed by the following Equation (1), which depends on the properties of the materials of the phosphor:

$$T = e(\tau - 1) \tag{1}$$

where $\tau$ is a property determined by the material of the phosphor. If, for example, phosphors corresponding to R, G, and B are mixed as in the white light source used for the above colored-image reading apparatus, the problem caused by the difference in afterglow property occurs due to the difference in $\tau$ value among the R, G, and B phosphors.

In general, the materials of phosphors are determined in terms of its luminescence wavelength property in each wavelength zone, luminescence efficiency, and lifetime expectancy, and the following materials are often used.

Blue: $BaMg_2Al_{16}O_{27}$
Central wavelength: 452 nm, T=2 $\mu$sec.
Red: $Y_2O_3$: $Eu^{2+}$
Central wavelength: 611 nm, T=1.1 msec.
Green: $LaPO_4$: Ce, Tb
Central wavelength: 544 nm, T=2.6 msec.

As described above, due to the difference in afterglow property among the colors (in particular, the attenuation time of blue is short), the barycenter of reading positions in the sub-scanning direction may differ among the colors.

This phenomenon will be described with reference to FIG. 22.

Typically, the solid-state image sensing device accumulates charges generated in proportion to the quantity of incident light during the Hsync period corresponding to the one accumulation time period. In addition, the duration in the figure corresponds to the time during which a current for driving the fluorescent lamp is provided in accordance with the duty, and in most cases, the current which oscillates at a high frequency is provided during this duration. After the time corresponding to the duration has passed, the intensity of light attenuates. This attenuation property is determined by the following two factors. One is the attenuation property of a bright-line spectrum emitted by the fluorescent lamp, and the other is the attenuation property of the intensity of light from the phosphors described above. While one accumulation time period corresponding to Hsync is normally several 100 $\mu$sec., the attenuation property of the bright-line spectrum is 1 $\mu$sec. or less, so it has almost no adverse effects. The attenuation property of the fluorescent lamp, however, ranges up to the ms order, so it significantly affects the total attenuation property. Thus, the attenuation property of the intensity of light is determined by the sum of the above two types of intensities of light and the attenuation property of each phosphor.

The typical afterglow of each of R, G, and B generated depending on the attenuation property is shown FIG. 22. In a fluorescent lamp which has emitted an approximately constant quantity of light over a duration driven by approximately constant amount of current, when the duration is over, the intensity of light corresponding to the bright-line spectrum instantaneously attenuates. The attenuated intensity corresponds to L1 in FIG. 22, and light of the intensity corresponding to L2, i.e. afterglow, attenuates depending on the attenuation property of the phosphors.

The afterglow property of each color conventionally causes the following problems in the image reading apparatus.

First, the one accumulation time period of the solid-state image sensing device is a temporal reference for reading an image as well as a reading position reference for reading the image in the sub-scanning direction. In addition, the pixel density in the main scanning direction with which image information is to be read is determined by the pixel size of the solid-state image sensing device, and the pixel density in the sub-scanning direction is determined by a relative moving distance between an original and a mirror for scanning the original during one accumulation time period during reading the original. Thus, the horizontal axis in the graph of FIG. 22 can be considered as showing the position. The phenomenon in which the barycenter of the quantity of light in the Hsync period is different among colors depending on the afterglow property of each color indicates that the barycenter of the reading position in the sub-scanning direction is offset depending on the color. The offset of the barycenter of the reading position in the sub-scanning direction causes color deviation in the sub-scanning direction, thereby degrading the performance of the image reading apparatus.

SUMMARY OF THE INVENTION

The present invention has been made in consideration of the above situation, and an object of the present invention is to prevent color deviation at a reading position in the sub-scanning direction caused by the difference in afterglow property among phosphors of the respective colors in controlling a white light source for irradiating an original with light.

According to the present invention, the foregoing object is attained by providing an image reading apparatus for forming an image of an original on a plurality of line sensors via an image-forming optical system to read the image, comprising: a white light source for irradiating the original with light, the light source having different afterglow properties for different colors corresponding to a plurality of read colors of the plurality of line sensor; control value determining means for determining, based on a quantity of light from the white light source, a control value for the white light source at a predetermined timing so that a barycenter of the quantity of light in the direction of a time axis in one charge accumulation time period almost aligns with the center of the one charge accumulation time period; and light source control means for controlling the white light source based on the control value determined by the control value determining means.

According to the present invention, the foregoing object is also attained by providing an image reading apparatus for forming an image of an original on a plurality of line sensors via an image-forming optical system to read the image, comprising: a white light source for irradiating the original with light, the light source having different afterglow properties for different colors corresponding to a plurality of read colors of the plurality of line sensors; a sensor for measuring a quantity of light from the white light source; control value determining means for determining, based on the statistical amount of the quantity of light from the white light source measured by the sensor, a control value for the white light source so that a barycenter of the quantity of light in the direction of a time axis in one charge accumulation time period almost aligns with the center of the one charge accumulation time period; and light source control means for controlling the white light source based on the control value determined by the control value determining means.

Furthermore, according to the present invention, the foregoing object is also attained by providing the control method, wherein the predetermined number is varied depending on the length of the irradiation time of the white light source in the one charge accumulation time period.

Furthermore, according to the present invention, the foregoing object is also attained by providing a method for controlling an image reading apparatus having a white light source for irradiating an original with light, the light source having different afterglow properties for different colors corresponding to a plurality of read colors of a plurality of line sensors, the image reading apparatus forming an image of the original irradiated in the white light source on the plurality of line sensors via an image-forming optical system to read the image, the method comprising: a measuring step of measuring the quantity of light from the white light source; a control value determining step of determining a control value for the white light source at a predetermined timing on the basis of the statistical amount of the quantity of light from the white light source measured in the measuring step so that the barycenter of the quantity of light in a direction of a time axis in one charge accumulation time period almost aligns with the center of the one charge accumulation time period; and a light source control step of controlling the white light source based on the control value determined in the control value determining step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 8 is a timing chart used to set the amount of delay according to the first embodiment of the present invention;

FIG. 22 is a graph showing a control waveform of a conventional light source and its afterglow property.

DETAILED DESCRIPTION OF THE PREFERRED EMBODIMENTS

Preferred embodiments of the present invention will be described in detail in accordance with the accompanying drawings.

The embodiments of the present invention will be described below in detail by exemplifying an image reading apparatus. Although the embodiments will be described in conjunction with the reading of a manuscript by illuminating it and receiving light reflected by the original, this invention is not limited to this aspect and can be similarly implemented by reading a transparent manuscript such as a film.

First Embodiment

Figure 1A:
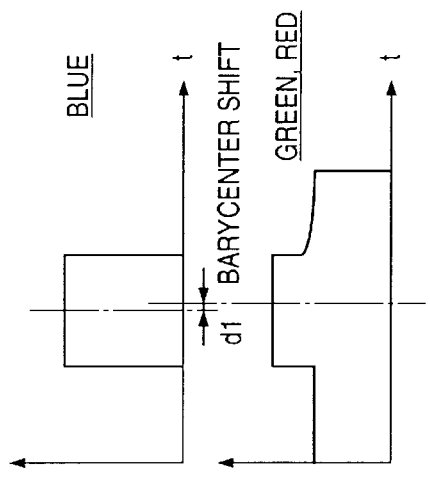
FIGS. 1A to 1D are graphs describing operations according to embodiments of the present invention.
Figure 1C:
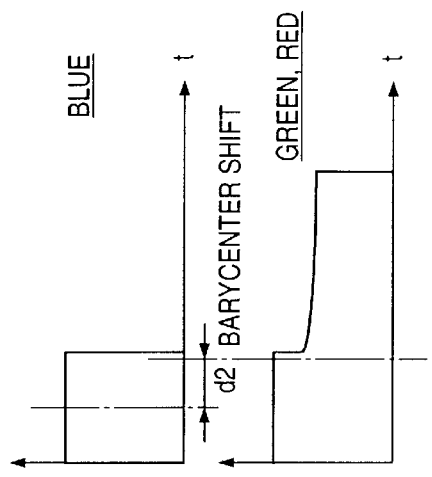
Figure 1B:
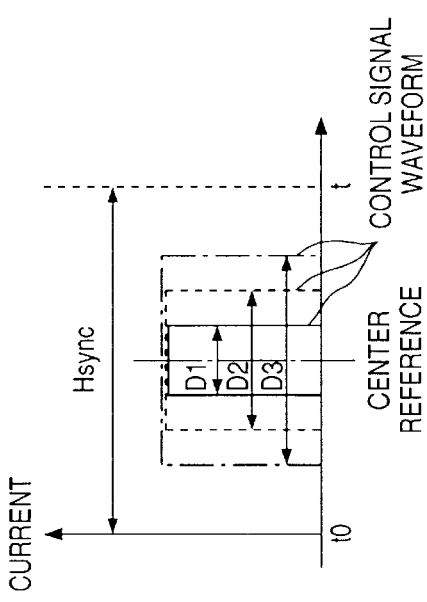

FIGS. 1A to 1D describe operations of an image reading apparatus according to a first embodiment. Of these figures, FIG. 1A shows a fluorescent lamp lighting method according to this invention which has the following characteristics compared to FIG. 1B representing the conventional lighting method. First, a duration control signal does not start control in synchronization with the timing $t_0$ of the leading or trailing edge of a signal indicating the start of the Hsync period, but provides control such that the center of the duration of the control signal aligns with the center of Hsync, as shown in FIG. 1A.

That is, according to the conventional example shown in FIG. 1B, the center of the pulse is offset because the pulse rises in synchronization with the start of the Hsync period despite the variation of the duty leading to the variation of the duration such as D1, D2, and D3. The first embodiment shown in FIG. 1A, however, provides control such that the position of the rising of the control signal pulse varies depending on the duty so that the center of the pulse remains aligned with the center of the Hsync period despite the variation of the duty leading to the variation of the duration such as D1, D2, and D3.

Figure 1D:
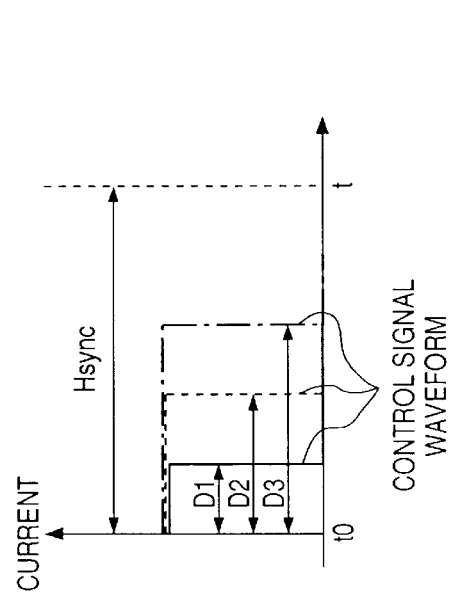

FIG. 1D shows the shift d2 of the barycenter attributable to the afterglow property of a fluorescent lamp according to a conventional control method, and indicates that the shift d2 is substantially affected by the afterglow property of each color.

In contrast, FIG. 1C shows the shift of the barycenter attributable to the afterglow property of a fluorescent lamp according to a control method of a first embodiment of the present invention. By setting the luminescence time at the center of Hsync, the amount of afterglow can be distributed to the intervals before and after the luminescence area so as to be averaged, thereby reducing the afterglow-induced shift of the barycenter down to a very small amount d1, that is, a level that does not contribute to degrading the performance of the image reading apparatus.

Next, a configuration for implementing the control method according to the present invention will be described.

In such an image reading apparatus, a light quantity sensor detects the quantity of light from a fluorescent lamp and a light quantity controller controls the quantity of light so that the quantity of light from a fluorescent lamp becomes constant.

Figure 2:
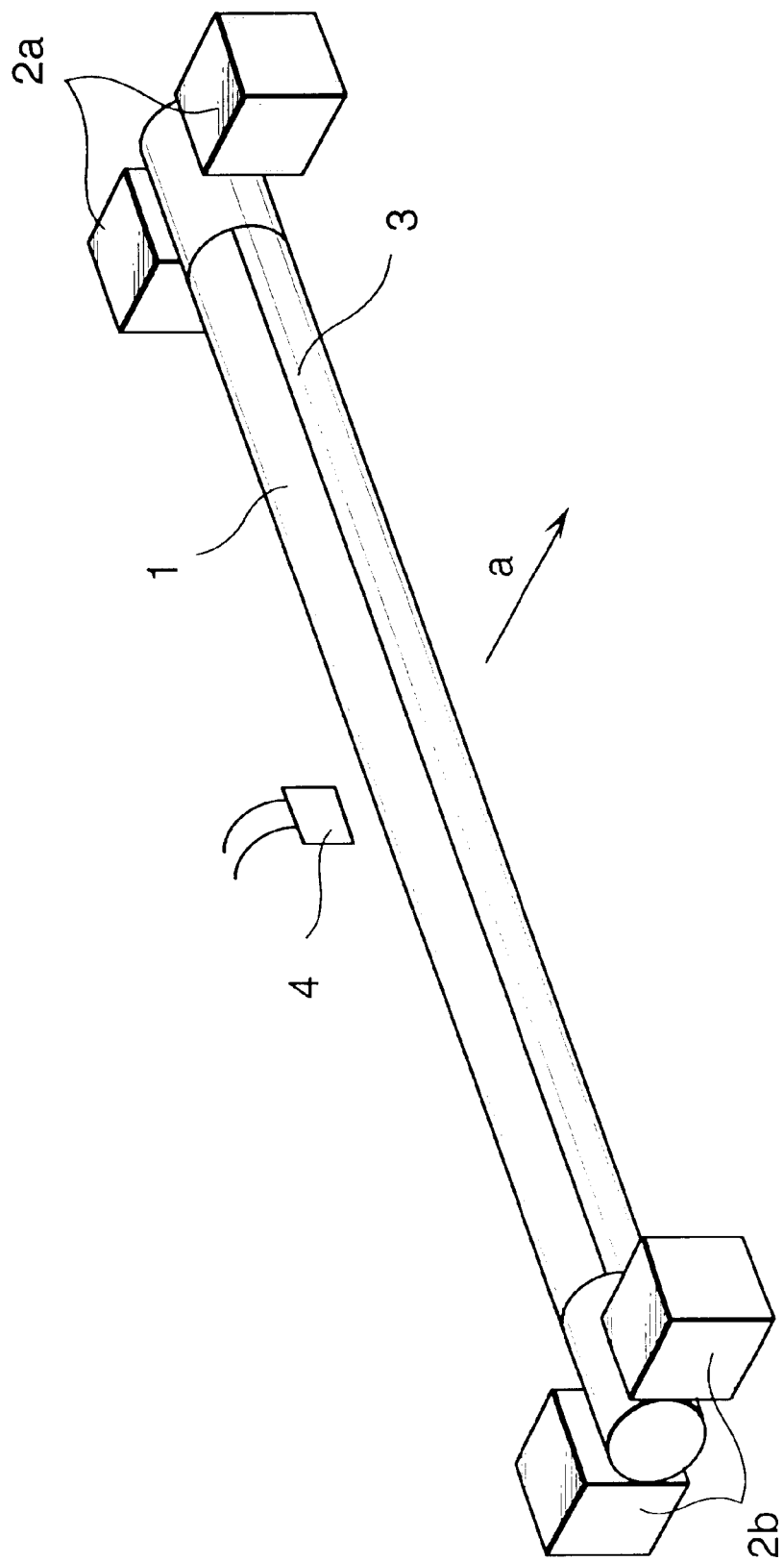
FIG. 2 is a perspective view of a light source including a fluorescent lamp.

FIG. 2 is a perspective view of a known light source composed of a fluorescent lamp. A fluorescent lamp 1 is supported at the respective ends by sockets 2a, 2b, and pins (not shown) on the sockets 2a, 2b supply currents.

An aperture section (an optical opening) 3 is provided in a predetermined area of the fluorescent lamp 1 so that an intense light is emitted in the direction shown by an arrow (a) while a relatively feeble light is emitted from the area other than the aperture section 3. In addition, a light quantity sensor 4 consisting of a photo diode is additionally provided at an appropriate position of the fluorescent lamp 1 to detect a current depending on the quantity of light emitted from the fluorescent lamp 1.

Figure 3:
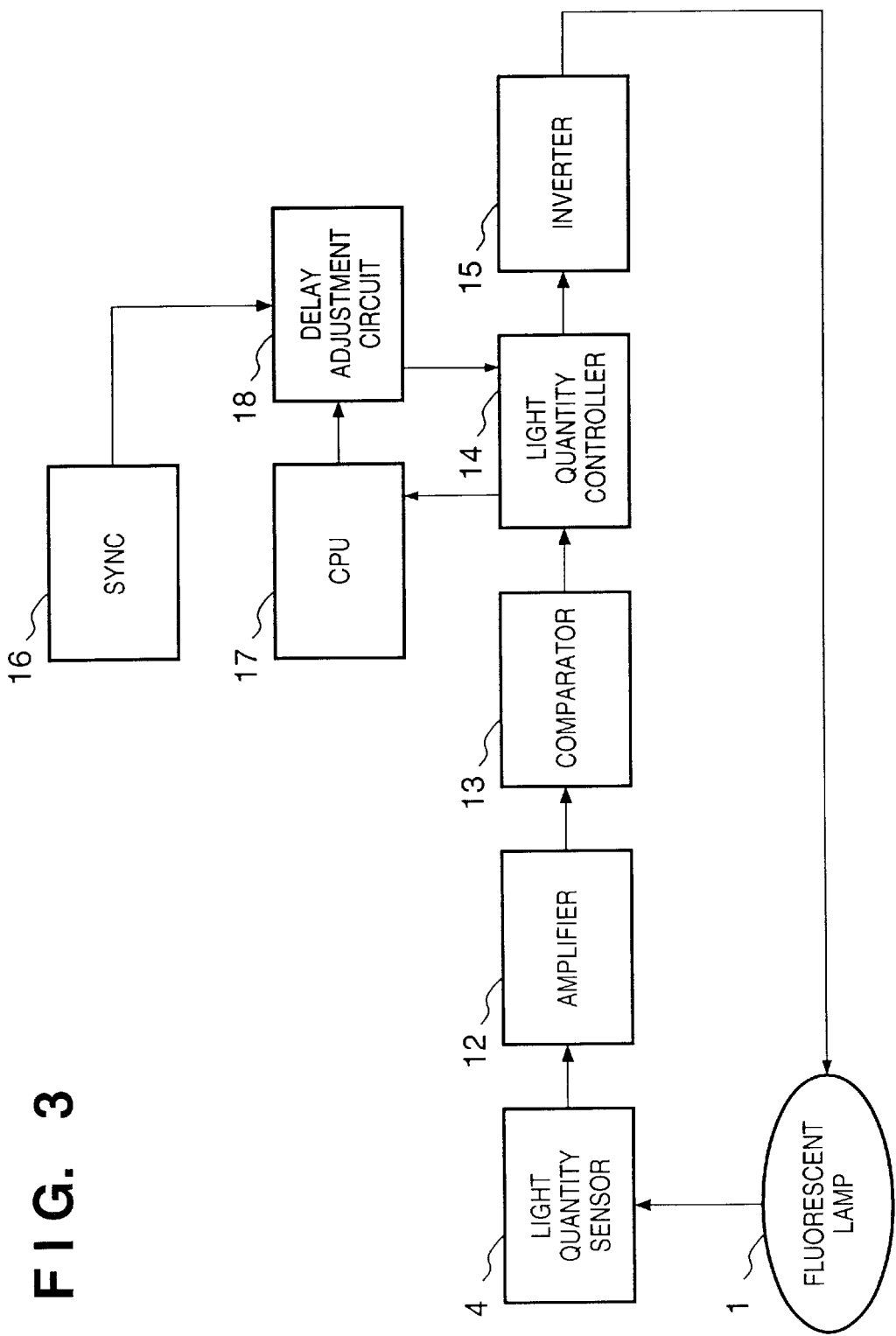
FIG. 3 is a block diagram showing a configuration of a light quantity controller according to a first embodiment of the present invention.

FIG. 3 is a block diagram indicating a configuration of a light quantity control section according to this embodiment.

The light quantity sensor 4 detects the quantity of light from the fluorescent lamp 1 to output a light quantity signal depending on the quantity of light, and an amplifier 12 converts the light quantity signal into a voltage and amplifies the voltage. Subsequently, a comparator 13 compares the amplified voltage value with a predetermined reference voltage, and the result of the comparison is input to a light quantity controller 14. The light quantity controller 14 outputs a duty cycle to be set in an inverter 15 to a CPU 17. The CPU 17 calculates how long the rising timing of a control signal pulse for the fluorescent lamp should be delayed relative to a signal indicating the start of the Hsync period corresponding to the duty cycle, in order to align the center of the control signal pulse with the center of the Hsync period, and outputs the result to a delay adjustment circuit 18.

A Sync signal sent from a Sync signal generating circuit 16 is input to the delay adjustment circuit 18, which delays the Sync signal for a predetermined period according to an instruction from the CPU 17 then outputs the Sync signal to the light quantity controller 14. The light quantity controller 14 outputs a pulse width modulation (PWM) signal in phase synchronism with the delayed Sync signal for duty control. Specifically, when a voltage value output from the amplifier 12 is larger than the reference voltage, a PWM signal is output that reduces the duty ratio. Whereas, when a voltage value output from the amplifier 12 is smaller than the reference voltage, a PWM signal is output that increases the duty ratio.

Then, when a PWM signal input from the light quantity controller 14 is at a high level, an inverter 15 provides control such that an alternating current (a lamp current) of a frequency sufficiently higher than the frequency of the PWM signal (for example, 10 to 100 times as high as the frequency of the PWM signal) is supplied to the fluorescent lamp 1 to light it. When this PWM signal is at a low level, the inverter 15 provides control such that the lamp current is interrupted to extinguish the fluorescent lamp 1. The frequency of the PWM signal is much lower than the optical frequency i.e., on-and-off frequency of the fluorescent lamp 1. Thus, electrically, lighting and extinguishing are repeated according to the cycles of a lamp current, but apparently, the lamp lights at a specified luminance corresponding to a current value equal to the mean of the lamp current, so that lighting and extinguishing are repeated according to the cycles of the PWM signal.

Next, a configuration of an image reading apparatus using a light quantity section having the aforesaid configuration will be described.

Figure 4:
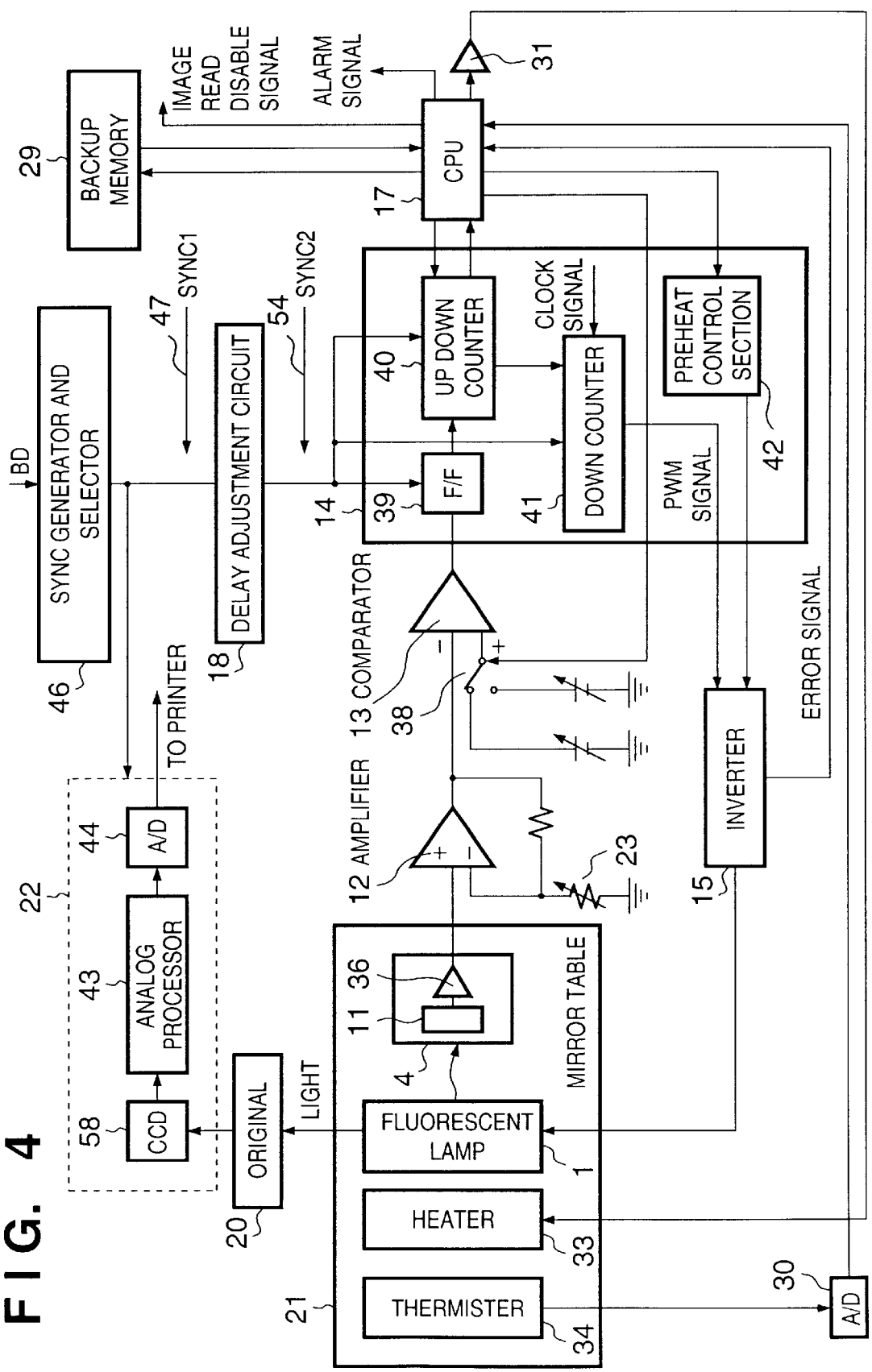
FIG. 4 is a block diagram showing a configuration of an image reading apparatus according to the first embodiment of the present invention.

FIG. 4 is a block diagram showing the configuration of an image reading apparatus according to the first embodiment. As shown in FIG. 4, the apparatus comprises a mirror table 21 that irradiates an original 20 with light, an image processing section 22 for applying predetermined image processing to an optical signal from the original 20 and outputting the result to an output apparatus such as a printer (not shown), an amplifier 12 for amplifying an output signal from the mirror table 21, a comparator 13 for comparing an output signal from the amplifier 12 with a reference signal and outputting the result of the comparison, the light quantity controller 14 consisting of an ASIC for outputting a PWM signal in phase synchronism with a predetermined synchronizing signal in order to control the quantity of light based on the output result of the comparator 13, an inverter 15 for performing a lighting operation based on an instruction from the light quantity controller 14, a CPU 17 for controlling the entire apparatus, and a backup memory 29 that stores the results of calculations executed by the CPU 17. Furthermore, 30 is an A/D converter, 31 is a driver, 46 is a circuit for generating a main-scanning synchronizing signal SYNC for the image reading apparatus and further selecting either the generated synchronizing signal SYNC or a printer main-scanning synchronizing signal BD (output SYNC1), and 18 is a delay adjustment circuit for delaying the output from the circuit 46 for an arbitrary period based on a set value (duty cycle) from the CPU 17, and outputting a synchronizing signal SYNC2 that aligns the luminescence period with the center of the Hsync period as described above.

The mirror table 21 has the fluorescent lamp 1; a heater 33 installed on the fluorescent lamp 1; and the light quantity sensor 4 for detecting the quantity of light from the fluorescent lamp 1 comprising a photo diode 11 and a preamplifier 36 for converting a fine current detected by the photo diode 11 into a voltage signal. The amplifier 12 receives a voltage signal output from the preamplifier 36 and a voltage signal from a variable resistor 23 and amplifies a light quantity signal to a required level.

A light quantity signal amplified by the amplifier 12 is input to a negative electrode of the comparator 13 and a reference voltage selected by a switch 38 is input to a positive electrode so that these signals are compared together. As the result of the comparison, the comparator 13 outputs a light quantity comparison signal. The switch 38 operates based on an instruction from the CPU 17 to enable the reference voltages to be switched.

The light quantity controller 14 comprises a flip-flop (F/F) circuit 39 for outputting a light quantity comparison signal from the comparator 13 in phase synchronism with a synchronizing signal, an up down counter 40 that increases or reduces the counter in synchronization with a synchronizing signal and based on a light quantity comparison signal, a down counter 41 for loading an output value from the up down counter 40 in phase synchronism with a synchronizing signal and executing a countdown at intervals of predetermined clocks, and a preheating control section 42 for preheating the fluorescent lamp 1 prior to lighting. The down counter 41 generates a PWM signal as described below. An output value from the up down counter 40 is input to the CPU 17, which can read a PWM value at an arbitrary point of time.

In an operation of the light quantity controller 14, if the light quantity signal is higher than a prescribed value, the phase-synchronized light quantity comparison signal value from the comparator 13, that is, the output from the F/F 39 is "0" and the output value from the up down counter 40 decreases by a predetermined value, thereby the value loaded in the down counter 41 is reduced and the PWM signal (pulse width) input to the inverter 15 is narrowed. In contrast, if the light quantity signal is lower than the prescribed value, the phase-synchronized light quantity comparison signal value from the comparator 13, that is, the output from the F/F 39 is "1" and the output value from the up down counter 40 increases by the predetermined value, thereby the PWM signal (pulse width) input to the inverter 15 is widened. Note, in turning on the image reading apparatus, the PWM value is set at a value at which the fluorescent lamp is lighted for the entire period of the Hsync period and is then converged to a predetermined value.

Then, when the PWM signal input to the inverter 15 is at a high level, the inverter 15 provides control such that an alternating current (a lamp current) of a frequency sufficiently higher than the frequency of the PWM signal (for example, 10 to 100 times as high as the frequency of the PWM signal) is supplied to the fluorescent lamp 1 to light it. When this PWM signal is at a low level, the inverter 15 provides control such that the lamp current is interrupted to extinguish the fluorescent lamp 1. Electrically, lighting and extinguishing are repeated according to the cycles of a lamp current, but apparently, the lamp lights at a specified luminance corresponding to a current value equal to the mean of the lamp current, so that lighting and extinguishing are repeated according to the cycles of the PWM signal.

The image processing section 22 has a CCD 58 for receiving an optical signal from the original 20 and converting it into an electric signal, an analog processor 43 for receiving an electric signal output from the CCD 58 and carrying out predetermined signal processing, and an A/D converter 44 for converting an analog signal output from the analog processor 43 into a digital signal. The CCD 58 accumulates charges read during one scanning period corresponding to one cycle of a synchronizing signal. Thus, if the flashing of the fluorescent lamp 1 synchronizes with the scanning by the CCD 58 within the same cycle, the output from the CCD 58 has a magnitude corresponding to the quantity of light received during one scanning period.

Figure 5:
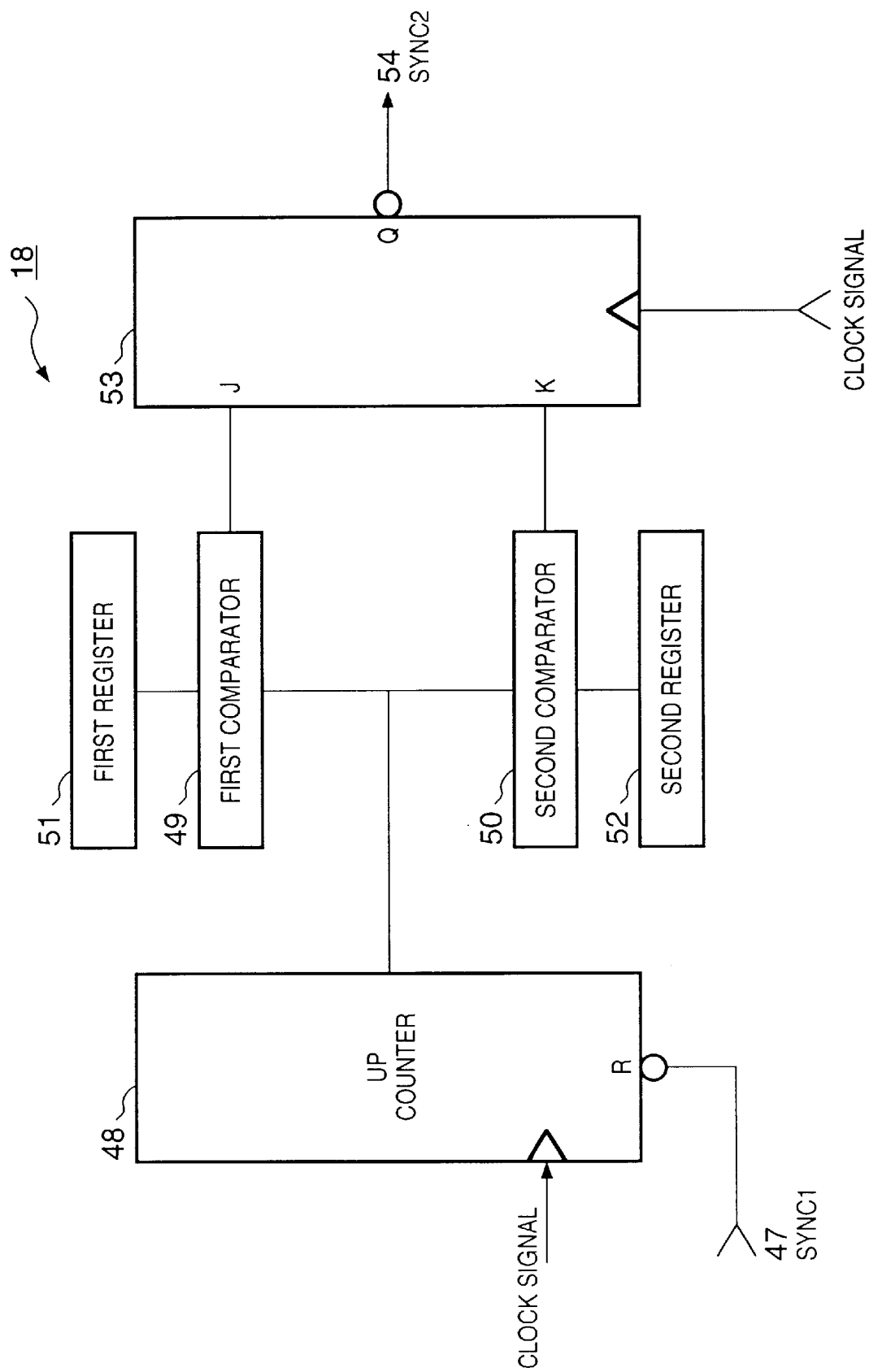
FIG. 5 is a block diagram showing a configuration of a delay adjustment circuit according to the first embodiment of the present invention.

Next, an example of a configuration of the delay adjustment circuit 18 will be described with reference to FIG. 5.

The delay adjustment circuit 18 is composed of counter 48 that is reset by a main synchronizing signal 47 (SYNC1) from the image processing section 22 and that executes a count up in response to a clock signal, a first and a second comparators 49 and 50 for determining trailing and leading edges of a synchronizing signal 54 (SYNC2) for triggering a PWM signal, a first and a second registers 51, 52, to which control values of leading and trailing edges, P1 and P2, of the synchronizing signal 54 (SYNC2) are set by the CPU 17, and a JK F/F 53.

If one main scanning period corresponds to A clocks (note a signal of each pixel is output from the CCD 58 in response to each clock signal), the control value P1 for the synchronizing signal 54 (SYNC2) to be set in the first register 51 (a value which determines at which clock from the start of the main scanning period the synchronizing signal 54 (SYNC2) is to be changed to low level) will be set by:

$$P1 = A/2 - \text{duty cycle } (\%) \times A/200 \qquad (2)$$

and the control value P2 (a value which determines at which clock from the start of the main scanning period the synchronizing signal 54 (SYNC 2) is to be changed to high level) will be set by:

$$P2 = A/2 - \text{duty cycle } (\%) \times A/200 + 1 \qquad (3)$$

Note, the pulse width of the synchronizing signal 54 (SYNC2) corresponds to one clock period according to the above equations (2) and (3); however, the pulse width is not limited to one clock period, and may be any width within the main scanning period. For instance, "+1" in the equation (3) may be replaced by "+(A−2)" or a smaller value.

Figure 6:
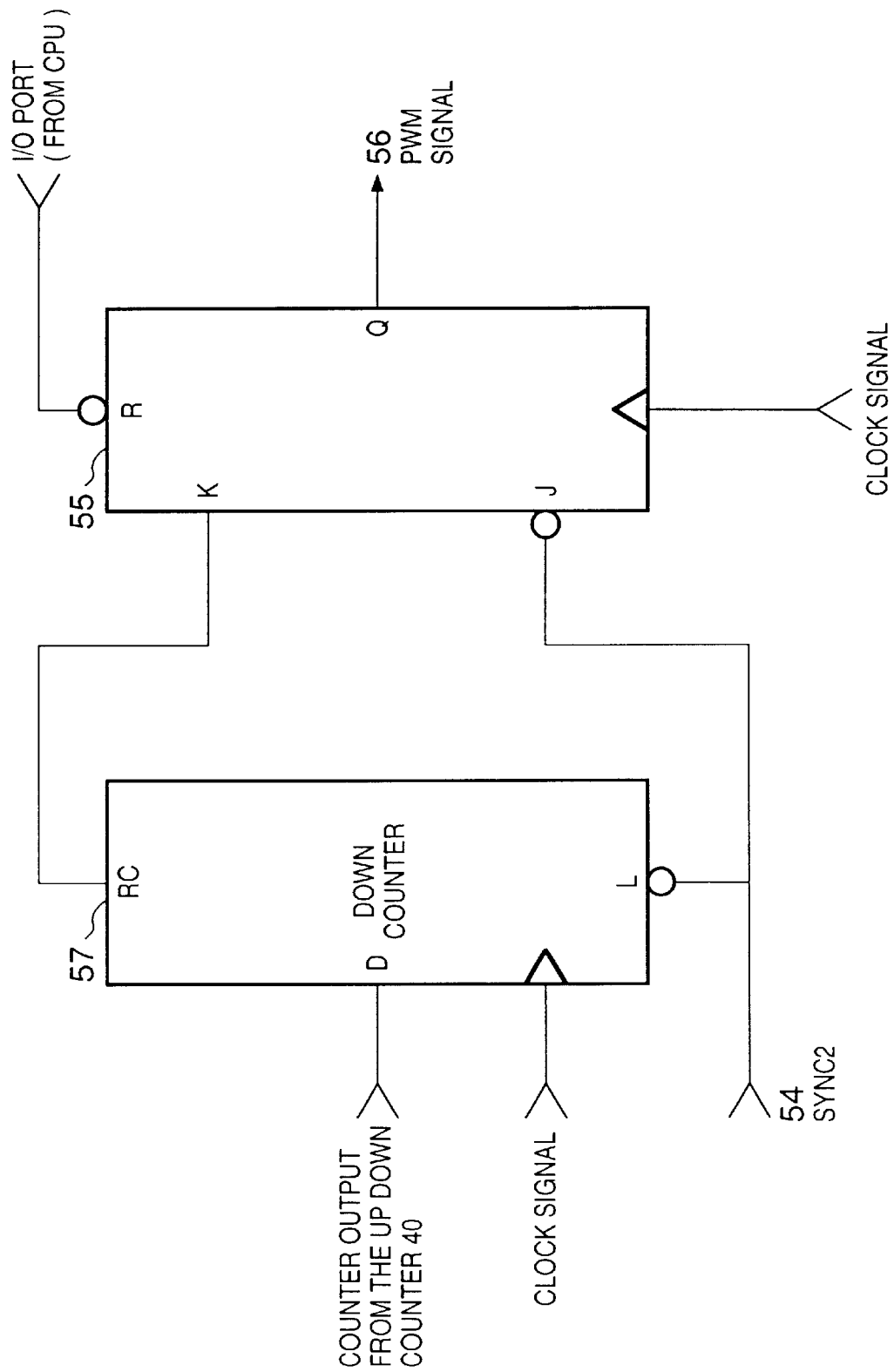
FIG. 6 is a block diagram showing a configuration of a down counter according to the first embodiment of the present invention.

FIG. 6 is a block diagram showing a configuration of the down counter 41, which is composed of a down counter 57 and a JK F/F 55.

The JK F/F 55 receives the SYNC2 (54) through a J input and an RC output from the down counter 57 through a K input then outputs a PWM signal 56. In addition, the JK F/F 55 is initialized in a desired manner upon reset.

The output signal from each component of the image reading apparatus of the above configuration will be described with reference to FIGS. 4, 7A, and 7B. The Sync and PWM signals, control current waveforms (tube currents), and the quantity of light will be described as the output signals.

Figure 7A:
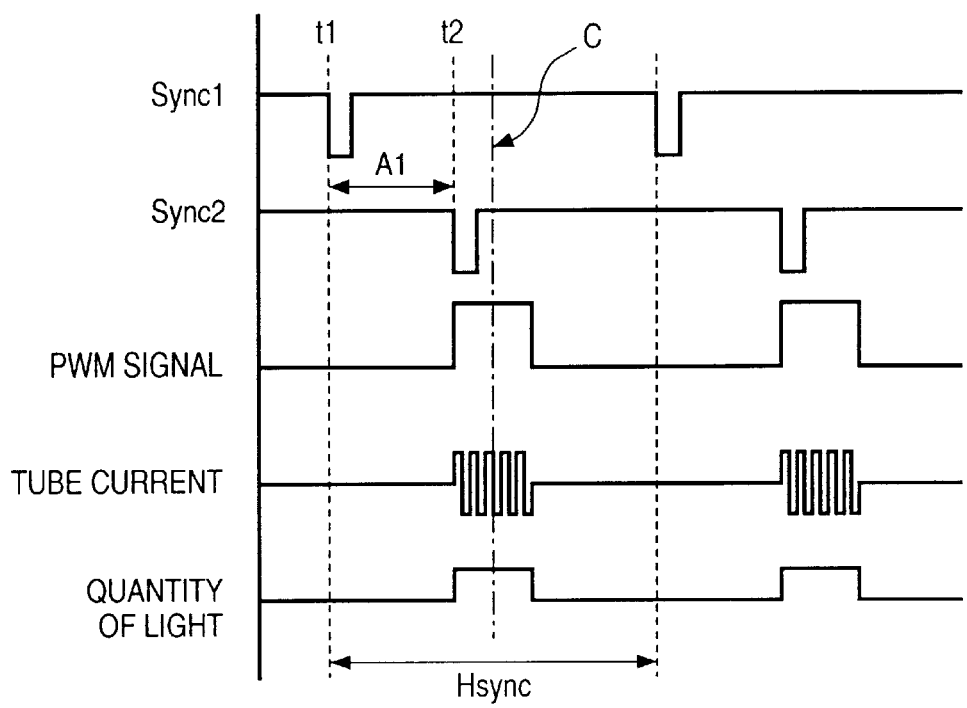
FIGS. 7A and 7B are timing charts used to control the image reading apparatus according to the first embodiment of the present invention.
Figure 7B:
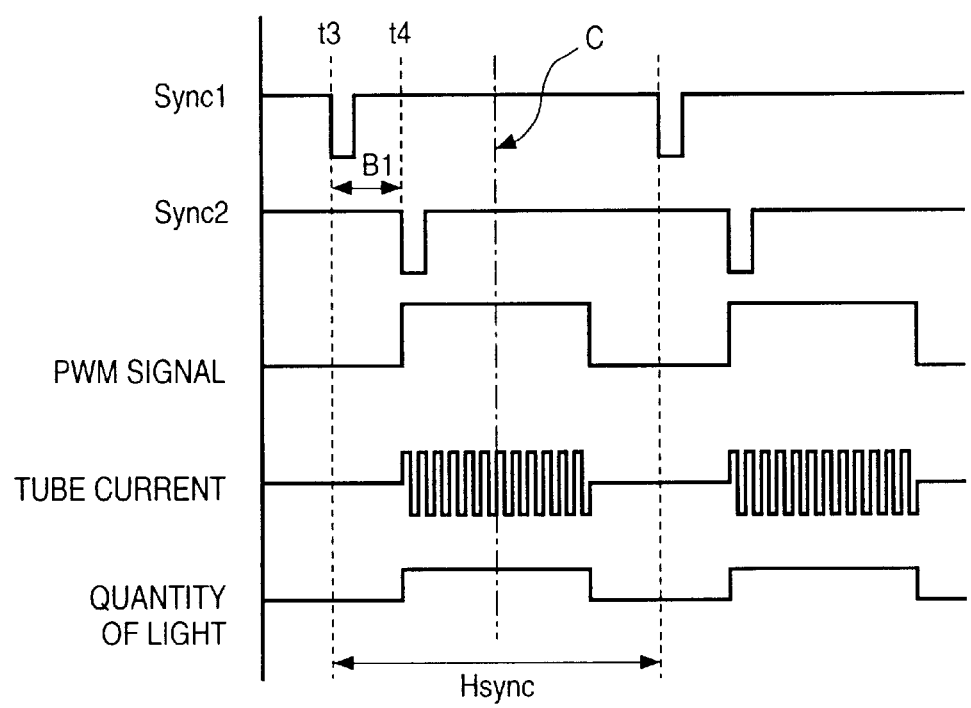

In FIGS. 7A and 7B, the horizontal axis indicates time, while the vertical axis indicates each output signal level. FIG. 7A represents output signals obtained when the duty cycle is about 25%, and FIG. 7B represents output signals obtained when the duty cycle is about 60%. The Sync1 represents a Sync signal output from the Sync generator 16 in the block diagram of the present invention shown in FIG. 3, and Sync2 represents a Sync signal that is delayed by the delay adjustment circuit 18 according to an instruction from the CPU 17 based on the duty cycle from the light quantity controller 14. When a trailing edge time t1 of Sync 1 is used as a reference, the delay time before a trailing edge t2 of Sync2 is represented by A1. The CPU 17 calculates the delay time A1 from the duty cycle from the light quantity controller 14 using, for example, the following equation (4):

$$T = S \times (100 - \text{duty cycle})/2 \qquad (4)$$

where T is a delay time, S is a Hsync period corresponding to one accumulation time period, and "duty" indicates a duty cycle represented in %. The PWM signal from the light quantity controller 14 is output in synchronization with the trailing edge t2 of delayed Sync2 so that high-level signals are output during the period determined by a predetermined duty cycle. The inverter 15 supplies the fluorescent lamp 1 with a current of a frequency sufficiently higher than the frequency of the PWM signal based on the PWM signal. Waveforms of this current are shown as the tube currents in FIGS. 7A and 7B. This tube current causes the fluorescent lamp 1 to apparently light at a specified luminance corresponding to a current value equal to the mean of the tube current. Note that, a line C that is the center of all signals including the PWM signal, the tube current, and the output quantity of light which are obtained during lighting of the fluorescent lamp almost aligns with the center of the trailing edges of two Sync1 pulses representing start of the Hsync period corresponding to one accumulation time of the solid-state image sensing device. In FIG. 7B, the center C that is the center of the signals including the PWM signal, the tube current, and the quantity of light also almost aligns with the center of the trailing edges of two Sync1 pulses. In FIG. 7B, the duty cycle is about 60% as described above, and a delay time B1 between a trailing edge t3 of Sync1 and a trailing edge t4 of Sync2 is calculated based on Equation (4). An increased duty cycle reduces B1 below the delay time A1 shown in FIG. 7A.

[Variation of the Duty Cycle]

In the pulse driving method (PWM) for a fluorescent lamp according to the first embodiment, if the same fluorescent lamp is continuously lighted with the same light quantity detection circuit, the temperature of the fluorescent lamp increases and the quantity of light will increase rather than maintaining the same value despite the application of a pulse of the same duration with the same duty cycle. Because of this, the duty cycle varies rather than remaining constant throughout one job for obtaining a specified quantity of light. If, for example, 100 A3-sized originals are to be read, the duty cycle may vary by 10% or more between the start and end of a job. Thus, if a duty cycle suitable for obtaining the quantity of light at the start of a job is continuously used, an error may occur. Accordingly, more frequent samplings are required, and the duty cycle should be sampled for e.g., each scan (each original) and fed back for setting amount of delay for the synchronizing signal Sync2.

[Setting Timing]

The setting of the amount of delay for a synchronizing signal is not performed in synchronization with the synchronizing signal but performed asynchronously by the CPU. Thus, in setting the amount of delay, the cycle or delay position of the synchronizing signal is undefined for one cycle. Consequently, the fluorescent lamp driving pulse deviates from its regular state for this one cycle, thereby instantaneously making the quantity of light unstable.

Thus, if the amount of delay is set during image reading, the read image may become abnormal. Thus, the set amount of delay cannot be changed during such a time period.

In addition, for the CCD driven based on a synchronizing signal, if the cycle of the synchronizing signal decreases below a predetermined value and the time before the start of image reading becomes short (several hundred ms or shorter), the read image may be affected even if the amount of delay is set at a point of time other than those during image reading.

Thus, it may be contemplated that the amount of delay is set while no image is being read, that is, while the optical system of the reading apparatus is returning to a reading start position (this operation will be hereafter referred to as "back scan") for the next reading scanning after finishing the shift in the sub-scanning direction. By setting the amount of delay immediately after the start of back scan, the several hundred ms of time required before normal reading can be executed can be sufficiently provided.

It may also be contemplated that a scan start synchronizing signal (RTOP) that is a trigger signal for activating a scanner motor is used as a trigger to set the amount of delay while simultaneously masking the synchronizing signal for one cycle. This operation prevents the output of a synchronizing signal having a cycle shorter than a specified cycle.

Mask processing for a synchronizing signal using the RTOP will be described below in detail.

[Timing Chart]

FIG. 8 is a timing chart used to perform the above operations.

The scan start synchronizing signal RTOP is high for one cycle of a reference synchronizing signal SYNC as shown in FIG. 8. A post-masking synchronizing signal MSKSYNC is the SYNC signal masked by the signal RTOP.

In FIG. 8, the amount of delay is set at T1 prior to the generation of the signal RTOP and is changed in synchronization with the RTOP signal by means of interruption so as to be T2 after the RTOP.

[Hardware configuration]

Figure 9:
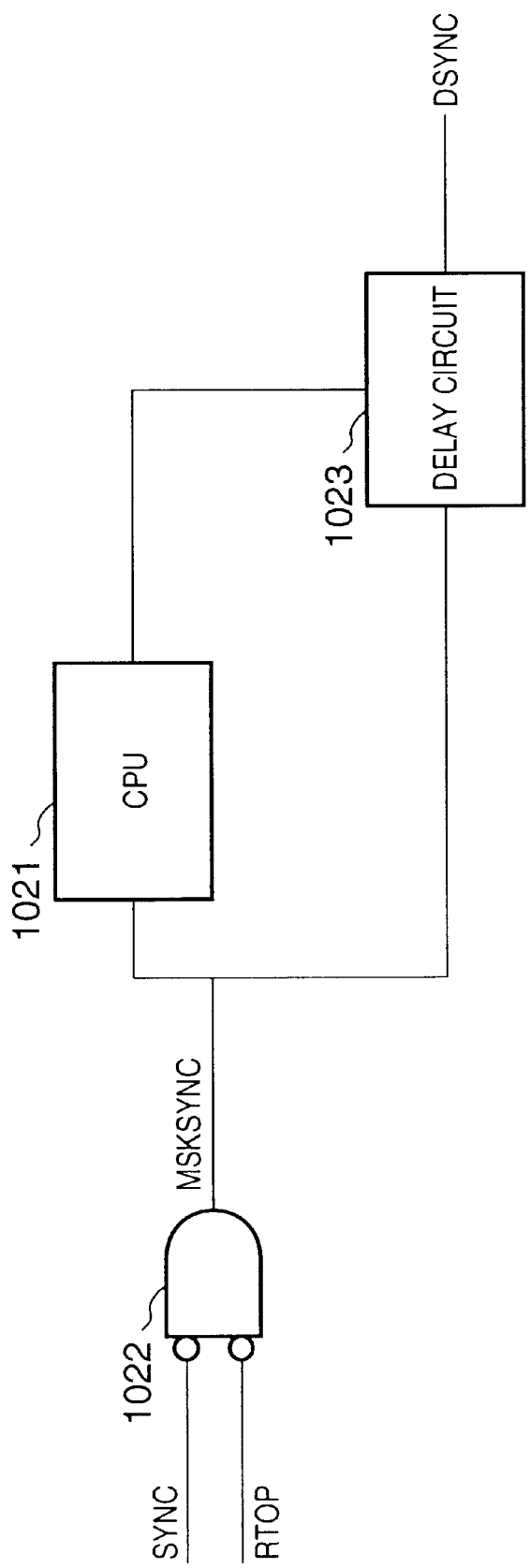
FIG. 9 shows a configuration of hardware for setting the amount of delay according to the first embodiment of the present invention.

FIG. 9 shows a configuration of hardware required to set the amount of delay.

In FIG. 9, 1021 is a CPU responsible for the entire apparatus, 1022 is a gate circuit for masking, and 1023 is a delay circuit.

The gate circuit 1022 receives the scan start synchronizing signal RTOP and the reference synchronizing signal SYNC, and generates MSKSYNC with the generation of the SYNC masked by the RTOP. MSKSYNC is input to an interruption terminal of the CPU 1021, which sets a register in the delay circuit 1023 by means of interruption. The delay circuit 1023 is means for generating a signal DSYNC that is obtained by delaying the input MSKSYNC by a value set by the CPU 1021.

[Setting the Amount of Delay]

Figure 10:
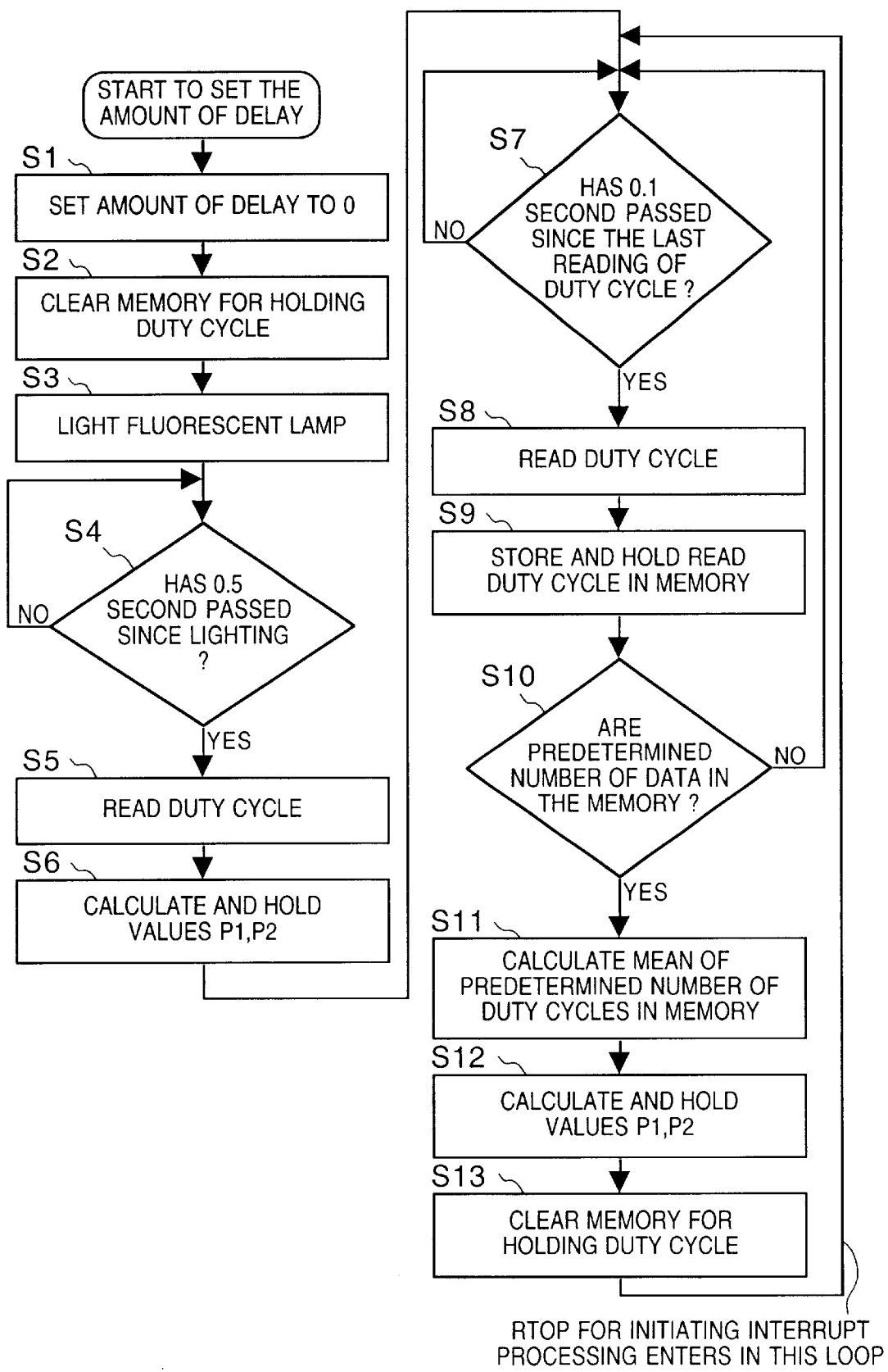
FIG. 10 is a flowchart showing control for setting the amount of delay according to the first embodiment of the present invention.

A series of control provided by the CPU 17 to read the duty cycle from the light quantity controller 14 and to set the amount of delay to the first and second registers 51 and 52 in the delay adjustment circuit 18 will be described below with reference to the flowcharts in FIGS. 10 and 11.

After an image reading operation has been started, the CPU 17 first sets "0" and "1" in the first and second registers 51 and 52, respectively, at step S1, and clears the entire memory area (not shown) used to hold the duty cycle described below, at step S2. At step S3, the fluorescent lamp 1, which has been extinguished, is lighted. Since the amount of delay to be set is calculated from the duty cycle, the amount of delay cannot be calculated as long as the fluorescent lamp 1 is extinguished. Thus, the fluorescent lamp 1 is lighted with no amount of delay set.

The luminance of the fluorescent lamp 1 is unstable immediately after the start of lighting. Thus, at step S4, the CPU 17 waits a predetermined time period (according to this embodiment, about 0.5 second) from the start of lighting until the luminance stabilizes, and reads the duty cycle from the light quantity controller 14 at step S5. At step S6, the CPU 17 calculates and holds values P1 and P2 to be set in the first and second registers 51 and 52 using the above Equations (2) and (3).

In response to the signal RTOP, provided after step S6, that activates a scanner motor, the CPU 17 sets the previously calculated values P1 and P2 in the first and second registers 51 and 52.

Thus, the settings for the first scan are based on the initially sampled duty cycle after the quantity of light has stabilized.

During a continuous scan operation, the CPU 17 reads the duty cycle at intervals of a predetermined time (according to the first embodiment, about 0.1 second) (steps S7 and S8) and stores a predetermined number (according to this embodiment, 32) of these values in the memory (not shown) (steps S9 and S10). When the predetermined number of duty cycles have been stored and held in the memory (YES in step S10), the CPU 17 calculates the mean of the stored duty cycles (step S11), recalculates P1 and P2 based on the mean at step S12, and holds these values (step S12). At step S13, the CPU 17 clears the entire memory.

Figure 11:
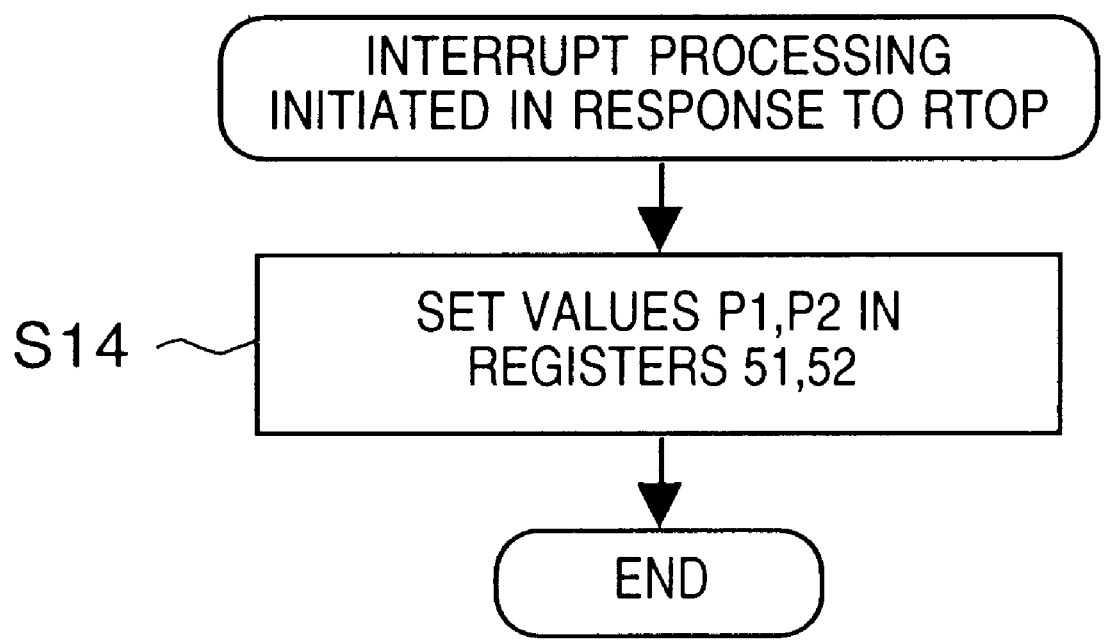
FIG. 11 is a flowchart showing control for setting the amount of delay according to the first embodiment of the present invention.

When the RTOP signal is provided during this continuous scan operation, the CPU 17 sets the held values P1 and P2 in the first and second registers 51 and 52, respectively, in order to update the amount of delay (step S14 in FIG. 11). The recalculations of P1 and P2 are executed asynchronously with the updating of the amount of delay based on the RTOP signal. That is, the RTOP signal is provided after each scan operation, that is, at intervals of about 4.5 seconds according to the first embodiment. In contrast, the set values P1 and P2 are updated at intervals of about 3.2 seconds according to the first embodiment.

Thus, the settings for the N-th scan operation (N is an integer larger than or equal to 2) are based on the duty cycles that have been collected up to the (N−1)-th scan operation.

In addition, although the values P1 and P2 set in the registers 51 and 52 are calculated from the mean of a plurality of detected data on the quantity of light in the first embodiment, the present invention is not limited to this aspect and the values P1 and P2 may be based on another statistical amount such as the median or mode of a plurality of detected data on the quantity of light.

Thus, despite the variation of the duty cycle, the center of the lighting control signal is not temporally offset but constantly aligns with the center of the Hsync period; thereby the barycenter of the quantity of light is situated close to the center of the Hsync period. Further, the effect of the quantity of light due to afterglow during the non-lighting period is substantially averaged for before and after the lighting period of one accumulation time period. Accordingly, even if the phosphor has different afterglow properties for different colors, the offset of the barycenter can be reduced to a very small value to minimize the color deviation during reads in the sub-scanning direction.

Second Embodiment

Next, a second embodiment of the present invention will be described. The configuration of the image reading apparatus used in the second embodiment is the same as the configuration described in the first embodiment with reference to FIGS. 1 to 6 and 9. Thus, its description is omitted.

Output signals from each component of the image reading apparatus of this configuration are described with reference to FIGS. 4 and 12A, 12B. In the second embodiment, the Sync and PWM signals, control current waveforms (tube currents), and the quantity of light are described as the output signals as in the first embodiment.

Figure 12A:
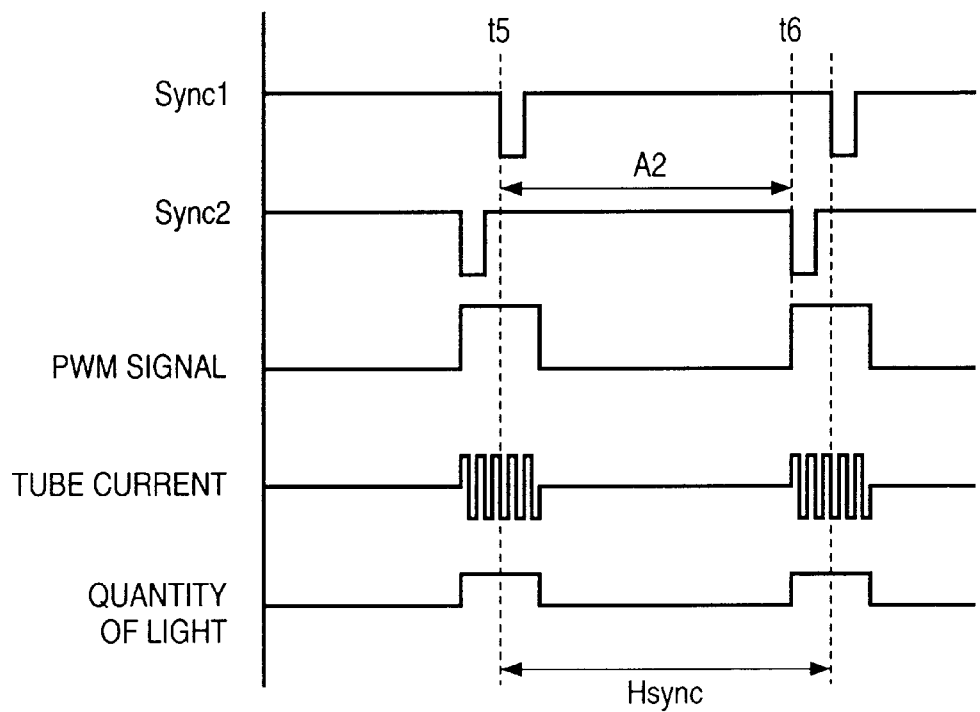
FIGS. 12A and 12B are timing charts used to control the image reading apparatus according to a second embodiment of the present invention.
Figure 12B:
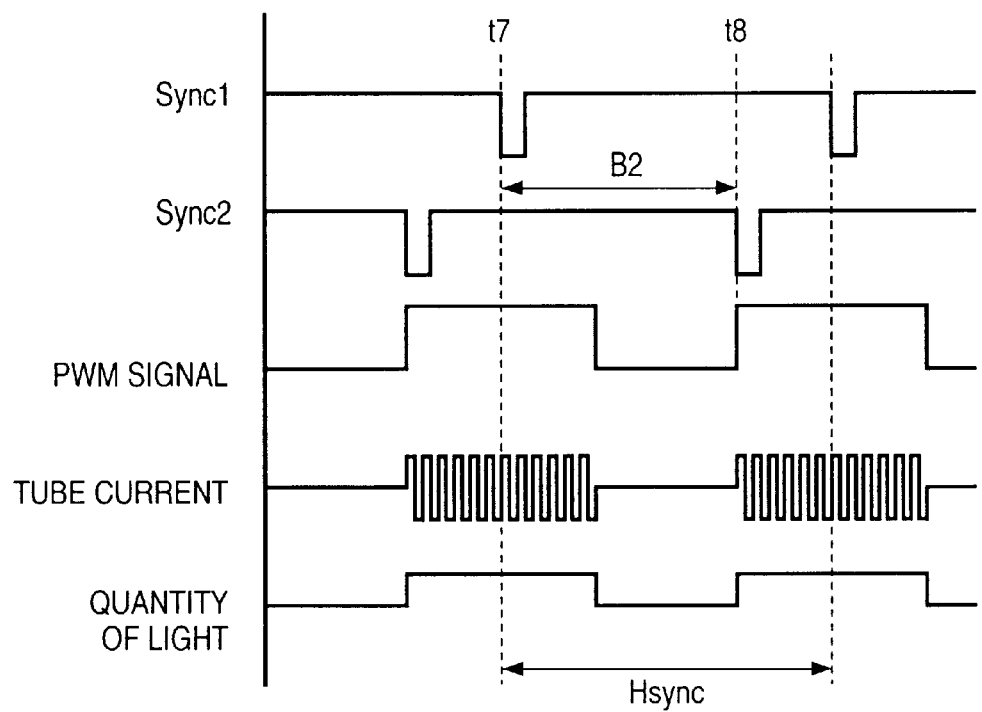

In FIGS. 12A and 12B, the horizontal axis indicates time, while the vertical axis indicates each output signal level. FIG. 12A represents output signals obtained when the duty cycle is about 25%, and FIG. 12B represents output signals obtained when the duty cycle is about 60%. Sync1 represents a Sync signal output from the Sync generator 16 in the block diagram of the present invention shown in FIG. 3, and Sync2 represents a Sync signal that is delayed by the delay adjustment circuit 18 according to an instruction from the CPU 17 based on the duty cycle from the light quantity controller 14.

In the second embodiment, a pulse width of the PWM signal is controlled so as to be symmetrical about the trailing edge of Sync1. When a trailing edge time t5 of Sync 1 is used as a reference, the delay time before a Sync2 trailing edge t6 is represented by A2. The CPU 17 calculates the delay time A2 from the duty cycle from the light quantity controller 14 using, for example, the aforesaid equation (4).

The PWM signal from the light quantity controller 14 is output in response to the trailing edge t6 of the delayed Sync2 and becomes high during the periods corresponding to a predetermined duty cycle. The inverter 15 supplies the fluorescent lamp 1 with a current of a frequency sufficiently higher than the frequency of the PWM signal based on the PWM signal. Waveforms of this current are shown as the tube currents in FIGS. 12A and 12B. This tube current causes the fluorescent lamp 1 to apparently light at a specified luminous intensity corresponding to a current value equal to the mean of the tube current. Note that line C that is the center of all signals including the PWM signal, the tube current, and the output quantity of light which are obtained during lighting of the fluorescent lamp almost aligns with the center of the trailing edges of two of Sync1 pulses representing start of the Hsync period corresponding to one accumulation time of the solid-state image sensing device. In FIG. 12B, the center C that is the center of the signals including the PWM signal, the tube current, and the quantity of light also almost aligns with the center of the trailing edges of two Sync1 pulses. In FIG. 12B, the duty cycle is about 60% as described above, and a delay time B2 between a trailing edge t7 of the Sync1 and a trailing edge t8 of Sync2 is calculated based on Equation (4). An increased duty cycle reduces B2 below the delay time A2 shown in FIG. 12A.

Thus, despite the variation of the duty cycle, the center of the lighting control signal is not temporally offset but constantly aligns with the center of the Hsync period; thereby the barycenter of the quantity of light is situated close to the center of the Hsync period. Further, the effect of the quantity of light due to afterglow during the non-lighting period is substantially averaged for before and after the lighting period of one accumulation time period. Accordingly, even if the phosphor has different afterglow properties for different colors, the offset of the barycenter can be reduced to a very small value to minimize the color deviation during reads in the sub-scanning direction.

Third Embodiment

Next, a third embodiment of this invention will be described. The configuration of the image reading apparatus used in the third embodiment is the same as the configuration described in the first embodiment with reference to FIGS. 1 to 6 and 9. Thus, its description is omitted and sections that are different from the first and second embodiments are explained in below detail.

[Variation of the Duty Cycle]

Generally, luminescence efficiency of fluorescent lamps changes over a relatively long time, thus, it is known that the quantity of light decreases if a pulse of the same duration is continuously applied thereto at the same duty cycle. That is, fluorescent lamps have nature in which the duty cycle required to generate the same quantity of light increases as time elapses.

Thus, by measuring the level of a temporal change in a fluorescent lamp, the current duty cycle depending on the temporal change can be determined with a certain accuracy, thereby enabling the amount of delay to be set depending on the change. This method enables the amount of delay to be set with a certain accuracy before actually lighting a fluorescent lamp, thereby minimizing the color deviation in the first scan operation in which the amount of delay cannot be calculated from the duty cycle because the fluorescent lamp is not lighted yet.

The duty cycle required to obtain a specified quantity of light increases in proportion to the accumulated lighting time of the fluorescent lamp and is expressed by the following relational expression (5):

$$\text{Duty cycle } (\%) = \alpha \times 100 \times Ct/Cl \quad (5)$$

where $\alpha$ denotes a proportion coefficient, Ct denotes the current accumulated lighting time of the fluorescent lamp, and Cl denotes the warranted lighting time of the fluorescent lamp (the lifetime expectancy of the fluorescent lamp).

In particular, copiers generally include clock ICs to collect service information on the time at which jam occurred and the period in which toner will be used up. Of these clock ICs, the value of a timer for constantly counting the lapse of time can be used to calculate the amount of delay for a synchronizing signal at a given time with a certain accuracy using Equations (2), (3), and (5) without increasing costs.

[Setting the amount of delay]

Figure 13:
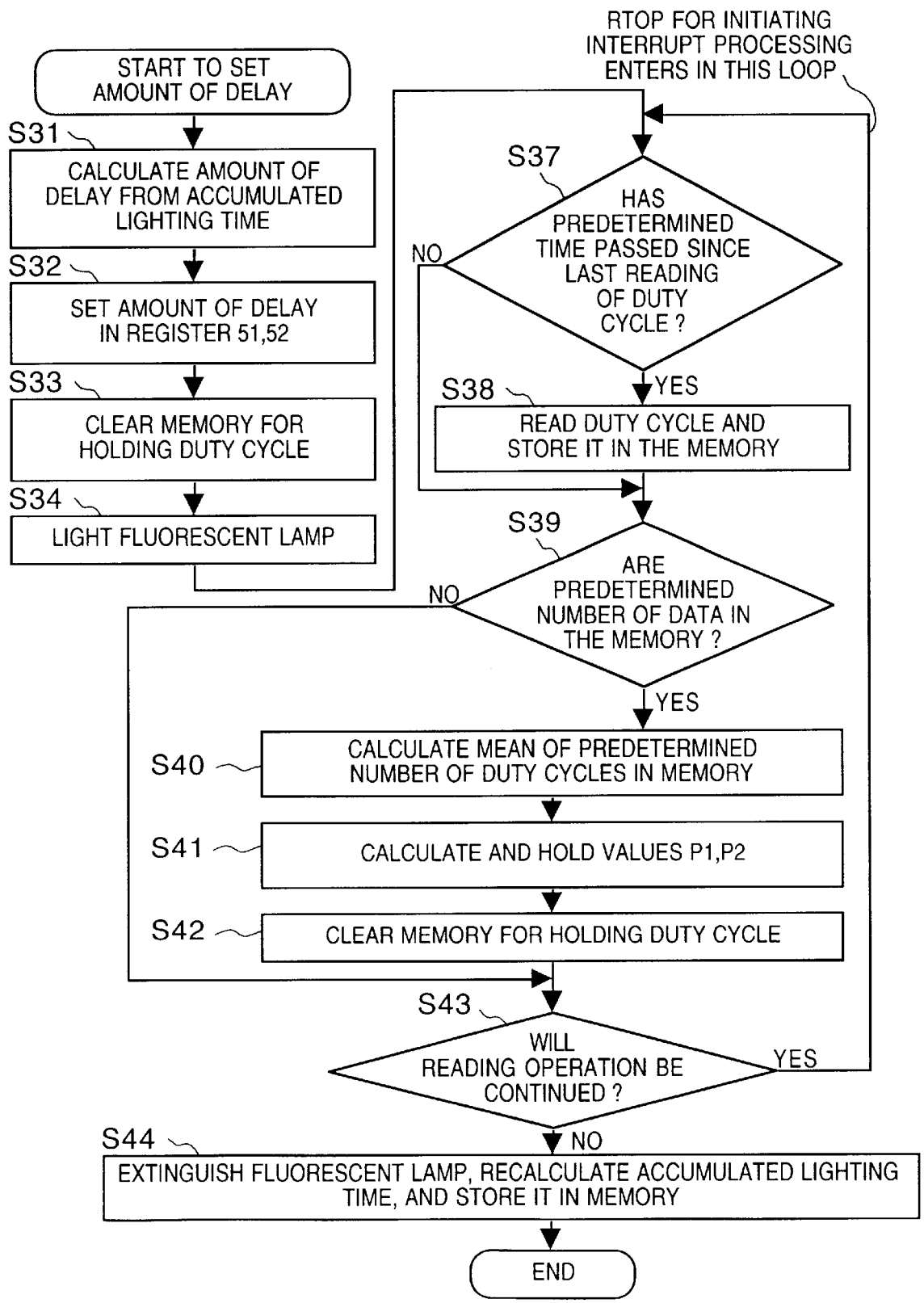
FIG. 13 is a flowchart showing control for setting the amount of delay according to a third embodiment of the present invention.

A series of control according to the third embodiment provided by the CPU 17 to read the duty cycle from the light quantity controller 14 and to set the amount of delay in the first and second registers 51 and 52 in the delay adjustment circuit 18 will be described below with reference to the flowchart in FIGS. 13 and 14.

After an image reading operation has been started, the CPU 17 first calculates the amount of delay for a synchronizing signal based on the accumulated lighting time held in memory (not shown) using Equations (2), (3), and (5), at step S31. After the calculation, in response to the signal RTOP that activates the scanner motor, the CPU 17 sets previously calculated P1 and P2 in the first and second registers 51 and 52, respectively, at step S32.

The reason for the use of the accumulated lighting time for calculating the amount of delay is as follows. If the amount of delay to be set is calculated using the duty cycle and while the fluorescent lamp 1 is extinguished, the light quantity sensor 11 cannot detect the luminous intensity of light emitted from the fluorescent lamp 1, thereby preventing the determination of the duty cycle and the calculation of the amount of delay. Thus, for lighting the fluorescent lamp during the first scan operation, the amount of delay calculated from the accumulated lighting time is set. At the same time, the time indicated by a timer (not shown) is read and stored in the memory as a lighting start time. The timer constantly counts up at specified time intervals. In addition, at step S33, the entire memory for holding the duty cycle described below is cleared, and at step S34, the fluorescent lamp 1 is lighted.

During a continuous scan operation, the CPU 17 reads the duty cycle at intervals of a predetermined time (according to the third embodiment, about 0.1 second) (steps S37 and S38) and stores a predetermined number (according to this embodiment, 64) of these values in the memory (not shown) (steps S38 and S39). When the predetermined number of duty cycles have been stored in the memory (YES in step S39), the CPU 17 calculates the mean of the stored duty cycles (step S40), recalculates P1 and P2 based on the mean, and holds these values (step S41). At step S42, the CPU 17 clears the entire memory.

Figure 14:
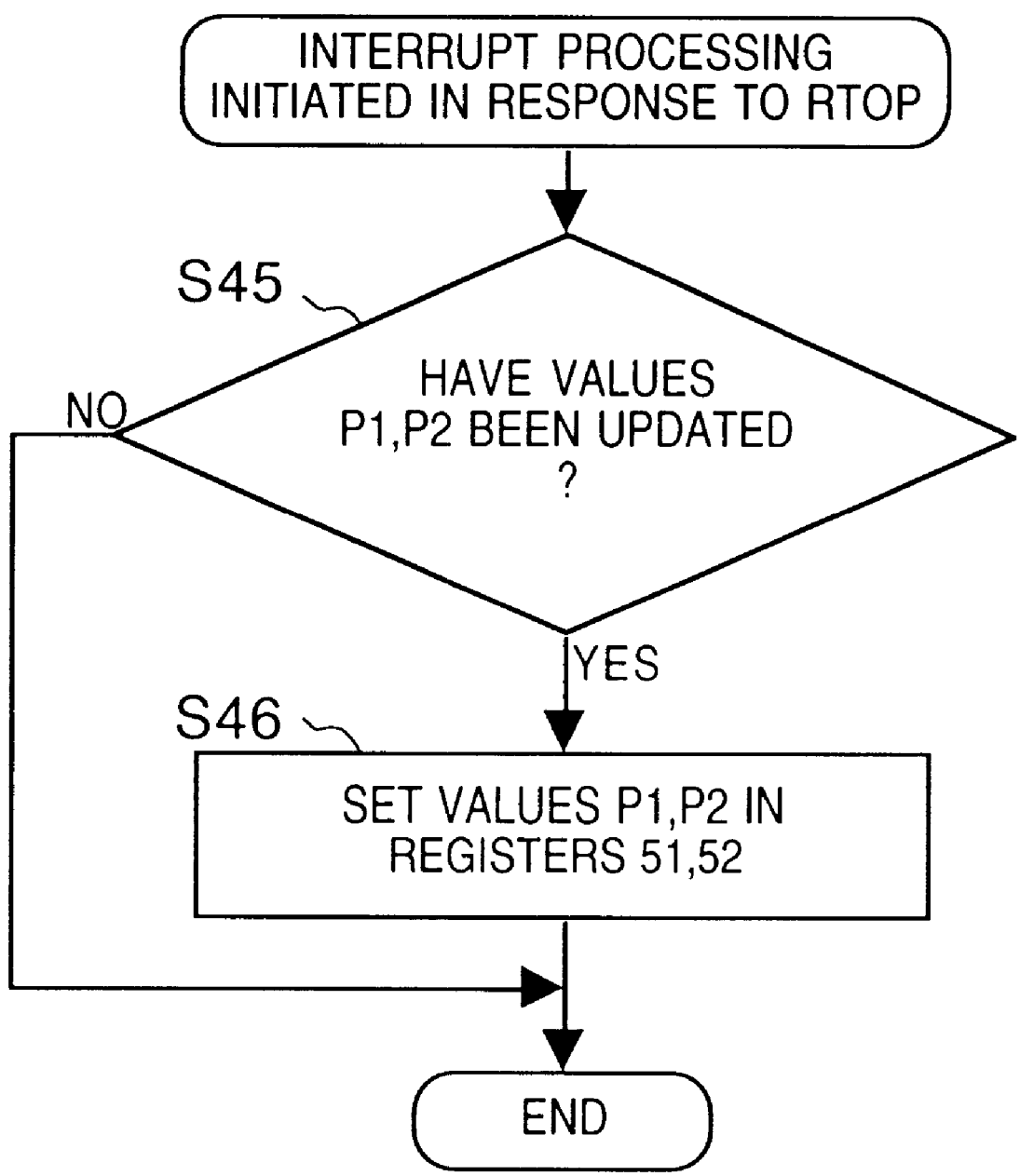
FIG. 14 is a flowchart showing control for setting the amount of delay according to the third embodiment of the present invention.

When the RTOP signal is provided during this continuous scan operation, the CPU 17 determines at step S45 in FIG. 14 whether the held values P1, P2 have been updated, and if so (YES in step S45), sets the values P1, P2 in the first and second registers 51 and 52, respectively, in order to update the amount of duty (step S46 in FIG. 14).

The recalculations of P1 and P2 are executed asynchronously with the updating of the amount of delay initiated in response to the RTOP signal. That is, the RTOP signal is provided after each scan operation, that is, at intervals of about 4.5 seconds according to the third embodiment. In contrast, the values P1 and P2 are updated at intervals of about 6.4 seconds according to the third embodiment.

As described above, the interval at which the values P1, P2 are updated is longer than the interval at which the RTOP signal is provided, so despite the provision of the RTOP signal, a predetermined number of samples on which recalculations for P1 and P2 are based may not have been carried out since preceding calculations. In this case, however, the amount of delay is not reset. Thus, the settings for the N-th scan operation (N is an integer larger than or equal to 2) are based on the duty cycles obtained up to the (N−1)-th scan operation, and thereafter, the amount of delay is recalculated each time a predetermined number of duty cycles are sampled.

Before extinguishing the fluorescent lamp, the CPU 17 reads the count value of the above timer to calculate the current lighting time, adds this value to the accumulated lighting time, and stores the resultant value in the memory.

In addition, although the values P1 and P2 set in the registers 51 and 52 are calculated from the mean of a plurality of detected data on the quantity of light in the third embodiment, the present invention is not limited to this aspect and the values P1 and P2 may be based on another statistical amount such as the median or mode of a plurality of detected data on the quantity of light.

Thus, despite the variation of the duty cycle, the center of the lighting control signal is not temporally offset but constantly aligns with the center of the Hsync period; thereby the barycenter of the quantity of light is situated close to the center of the Hsync period. Further, the effect of the quantity of light due to afterglow during the non-lighting period is substantially averaged for before and after the lighting period of one accumulation time period. Accordingly, even if the phosphor has different afterglow properties for different colors, the offset of the barycenter can be reduced to a very small value to minimize the color deviation during reads in the sub-scanning direction.

Fourth Embodiment

Figure 15:
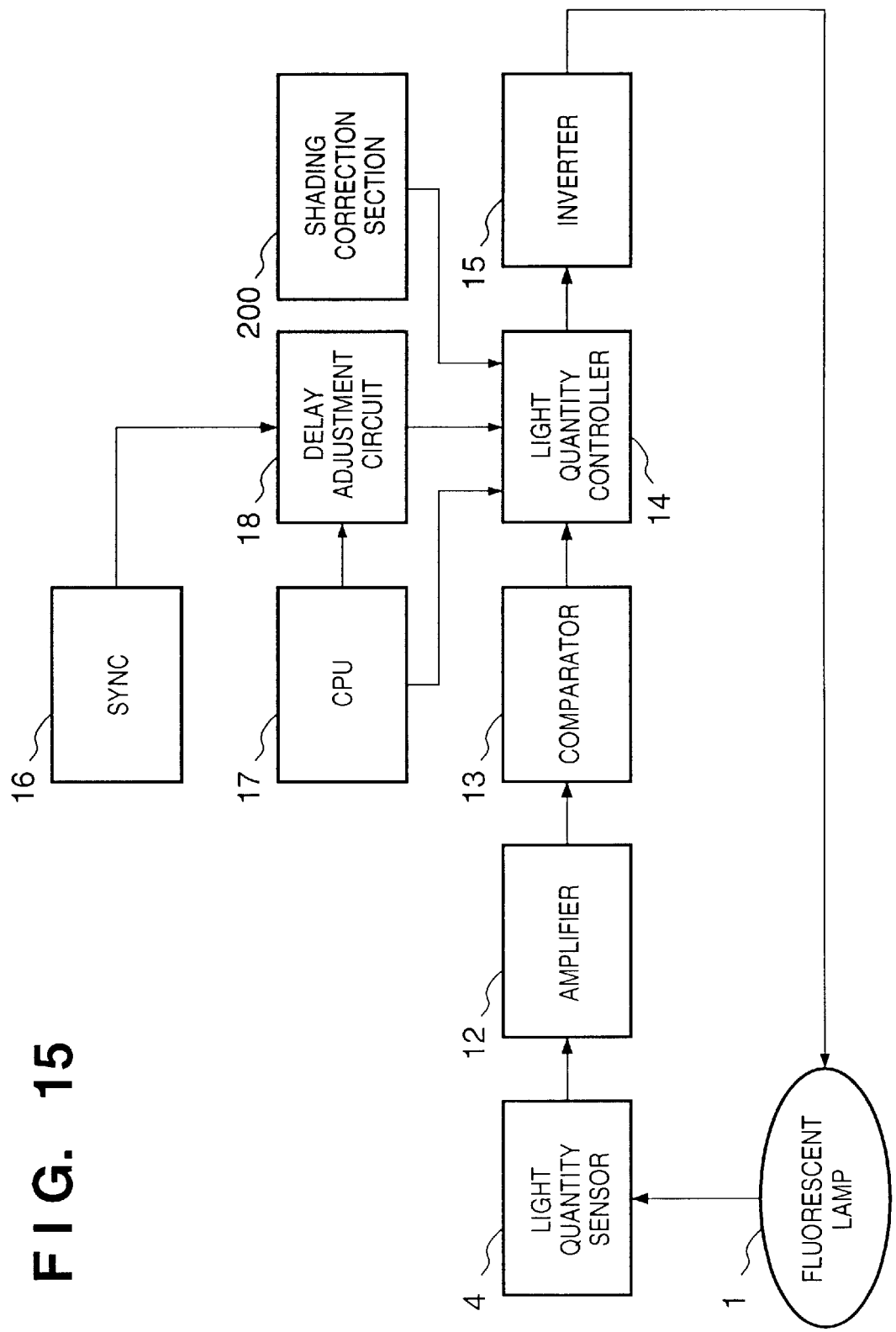
FIG. 15 is a block diagram showing a configuration of a light quantity controller according to a fourth embodiment of the present invention.
Figure 16:
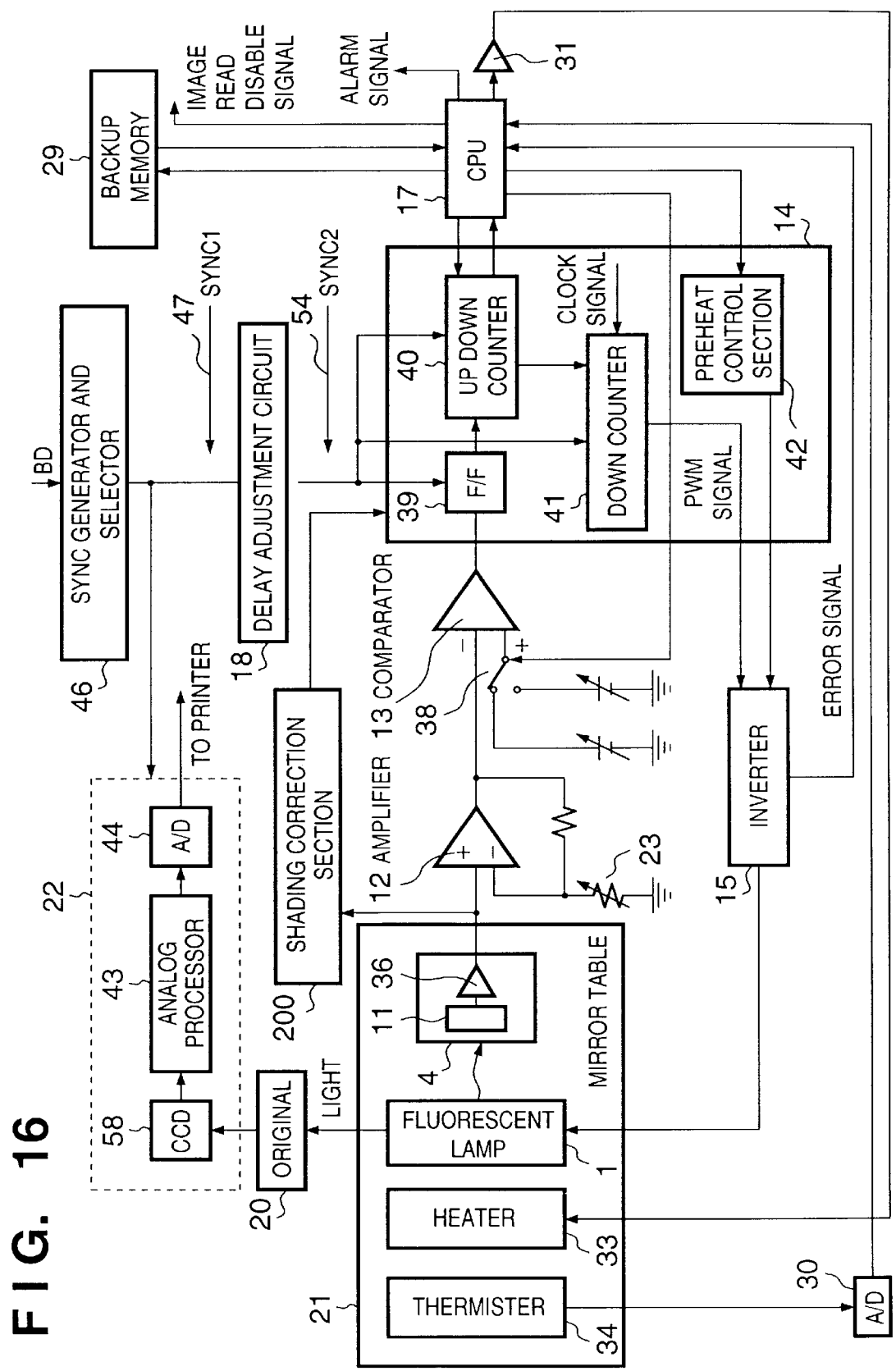
FIG. 16 is a block diagram showing a configuration of an image reading apparatus according to the fourth embodiment of the present invention.

A fourth embodiment will be described below. The fourth embodiment relates to the calculation and setting of the amount of delay described in the first to third embodiments, as well as the updating of a shading correction value. Thus, in addition to the configuration of the image reading apparatus described in the first to third embodiments shown in FIGS. 3 and 4, the fourth embodiment includes a shading correction section 200, as shown in FIGS. 15 and 16.

Shading correction is described below.

Shading correction is a well known technique generally used for image reading apparatuses.

Even if an original of a uniform density is read, the output from the CCD is not always uniform due to the following factors.

Variation in the sensitivity of each pixel of the CCD

Difference in the quantity of transmission light between the center and periphery of a lens Difference in the quantity of light between the center and ends of the fluorescent lamp To correct the variation of outputs caused by the above factors, a standard white sheet (not shown) installed at an end of a platen and for which a reference value to be read has been provided and which has a sufficiently uniform density is read (this operation is hereafter referred to as a "shading measurement") to calculate a shading correction value from the reference and measured values so that a read image signal of an original is corrected.

As described above, the standard white sheet is read to determine the shading correction value, so if the variation of the quantity of light emit by the fluorescent lamp during a continuous scan operation affects the read image signal, the shading measurement must be conducted at a proper time between scan operations to update the shading correction value. According to the fourth embodiment, in response to the RTOP signal provided at intervals of 2 scan operations, the shading measurement is conducted immediately before the start of a scan operation to read an image to update the shading correction value.

Figure 17:
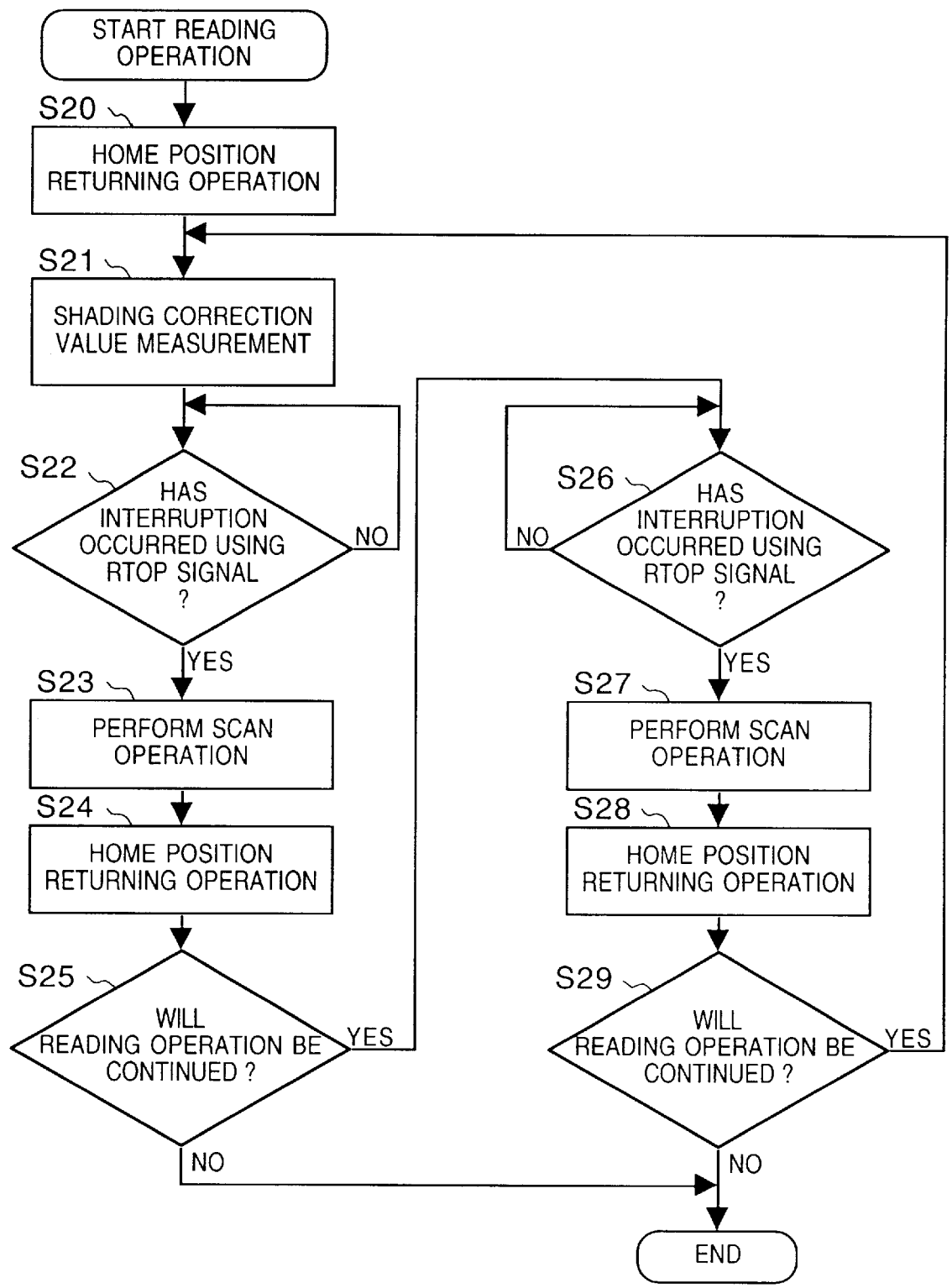
FIG. 17 is a flowchart showing control for setting the amount of delay according to the fourth embodiment of the present invention.

The timings with which the shading measurement operation is performed during a continuous scan operation according to the fourth embodiment will be explained with reference to FIG. 16 and the flowchart in FIG. 17.

To start an image reading operation, the CPU 17 moves the mirror table 21 to a position called a "home position" at which an image reading operation is started at step S20, and performs the shading measurement at step S21. After these operations, the CPU 17 waits for the RTOP signal that is a trigger signal for activating the scanner motor for the image reading operation at step S22. When the RTOP signal is provided (YES in step S22), the process proceeds to step S23 to perform a scan operation for reading an image, and then at step S24, performs a home position returning operation for the next image reading operation. If the image reading operation is continuously performed (YES in step S25), the CPU 17 waits for the RTOP signal at step S26. In response to the RTOP signal (YES in step S26), the CPU 17 performs the scan operation at step S27, and subsequently performs the home position returning operation at step S28.

After two scan operations have been performed, if image reading is to be continued (YES in step S29), the process returns to step S21 to perform the shading measurement and then to update the shading correction value, followed by the scan operation as described above.

As for reasons for deterioration of image quality, the variation of the quantity of light leading to inappropriate shading correction values has more adverse effects than the color deviation in the sub-scanning direction caused by the difference in afterglow property of the phosphors between colors. Thus, it is a sufficient and optimum frequency that the amount of delay is set simultaneously with the updating of the shading correction value based on the shading measurement.

Figure 18:
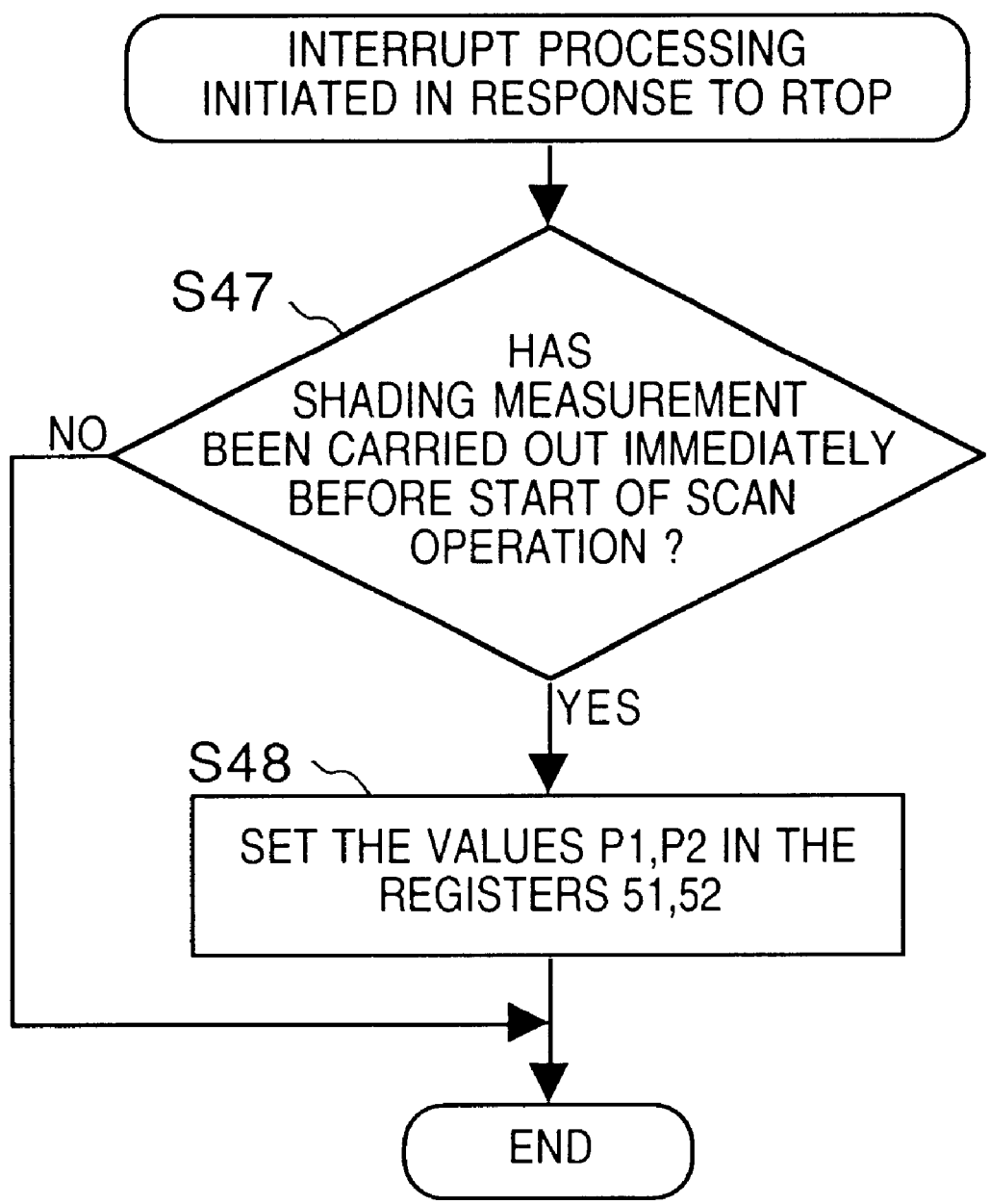
FIG. 18 is a block diagram showing a configuration of a light quantity control section according to a fifth embodiment of the present invention.

In addition, according to the fourth embodiment, to interrupt the continuous scans for the image reading operation described with reference to FIGS. 10, 11, 13, and 14, using the RTOP signal, the CPU 17 determines at step S47 whether the shading measurement has just been conducted and at step S48, sets the values P1, P2 in the first and second registers 51 and 52 if the RTOP signal is provided after the shading correction (YES in step S47), as shown in FIG. 18. Accordingly, the amount of delay is set after each shading measurement.

As described above, the fourth embodiment provides not only effects similar to those of the first to third embodiments but also optimum control that does not depend on the variation of the duty of the fluorescent lamp induced by continuous lighting, because the amount of delay is set after each shading measuring operation.

Fifth Embodiment

Next, a fifth embodiment of this invention will be described. The configuration of the image reading apparatus used in the fifth embodiment is the same as the configuration described in the first to third embodiments with reference to FIGS. 1 to 6 and 9. Thus, its description is omitted. The timings with which the amount of delay is set according to the fifth embodiment will be described below in detail.

Figure 19:
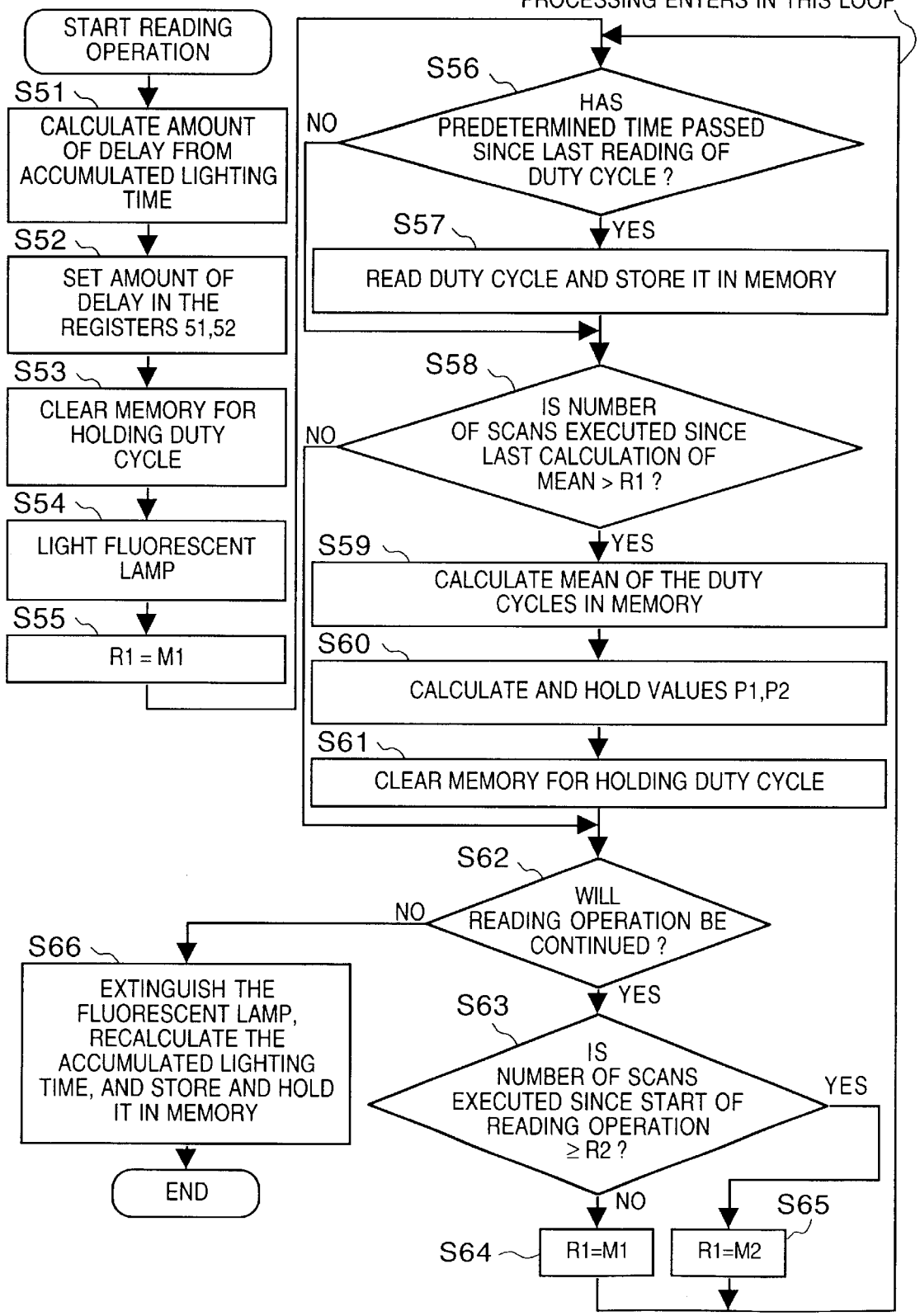
FIG. 19 is a flowchart showing control for setting the amount of delay according to the fifth embodiment of the present invention.

Specifically, a series of control according to the fifth embodiment provided by the CPU 17 to read the duty cycle from the light quantity controller 14 and to set the amount of delay to the first and second registers 51 and 52 in the delay adjustment circuit 18 will be described below with reference to the flowchart in FIGS. 19 and 14.

After an image reading operation has been started, the CPU 17 first calculates the amount of delay for a synchronizing signal based on the accumulated lighting time held in memory (not shown) using Equations (2), (3), and (5), at step S51. After the calculation, in response to the signal RTOP that activates the scanner motor, the CPU 17 sets previously calculated P1 and P2 in the first and second registers 51 and 52, respectively, at step S52.

The reason for the use of the accumulated lighting time for calculating the amount of delay is as follows. If the amount of delay to be set is calculated using the duty cycle and while the fluorescent lamp 1 is extinguished, the light quantity sensor 11 cannot detect the luminous intensity of light emitted from the fluorescent lamp 1, thereby preventing the determination of the duty cycle and the calculation of the amount of delay. Thus, for lighting the fluorescent lamp during the first scan operation, the amount of delay calculated from the accumulated lighting time is set. At the same time, the time indicated by the timer (not shown) is read and stored in the memory as a lighting start time. The timer constantly counts up at specified time intervals. In addition, at step S53, the entire memory for holding the duty cycle described below is cleared, and at step S54, the fluorescent lamp 1 is lighted.

Figure 20:
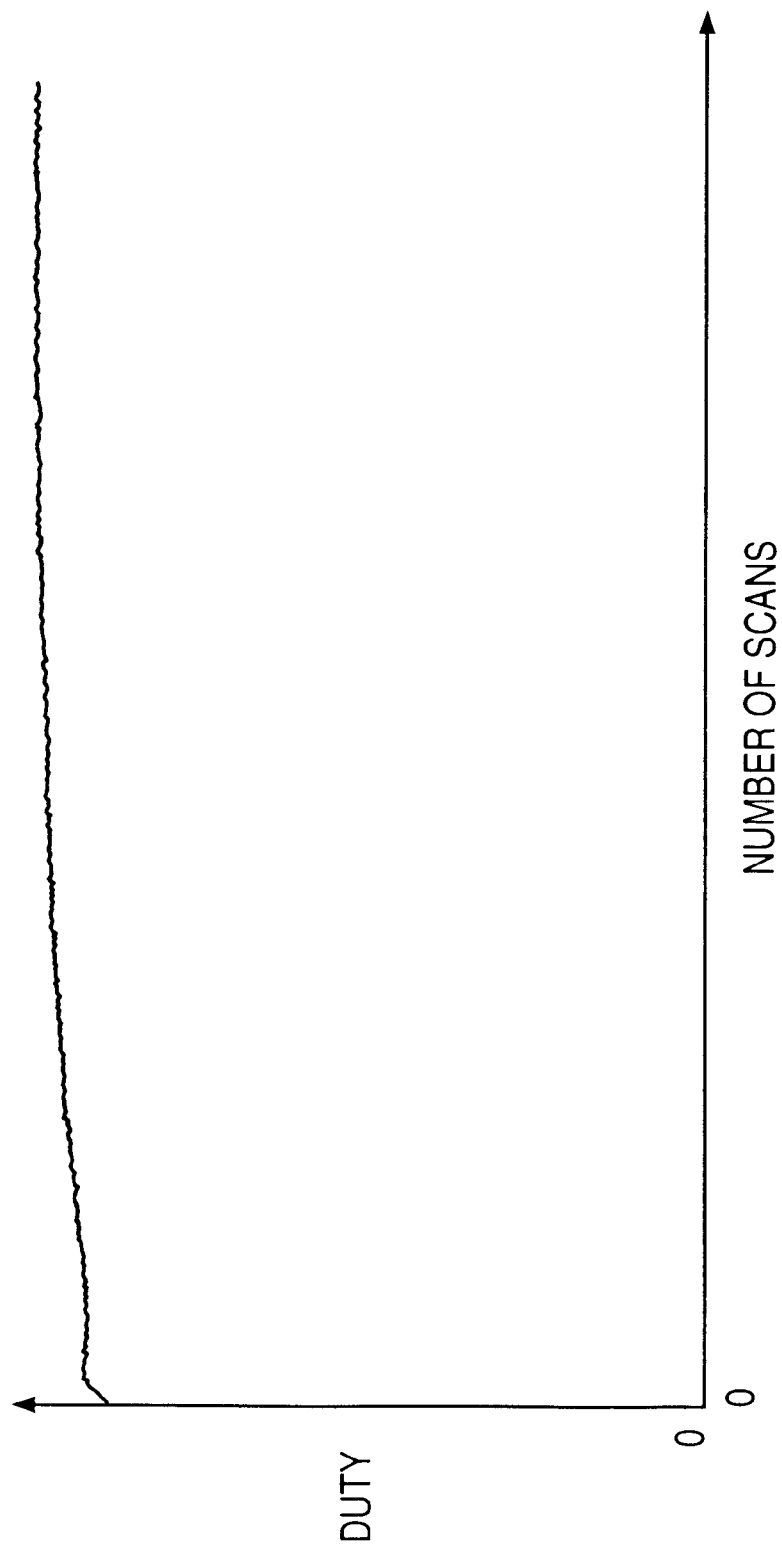
FIG. 20 is a graph showing a variation in a duty cycle during a continuous scan operation according to the fifth embodiment of the present invention.
Figure 21:
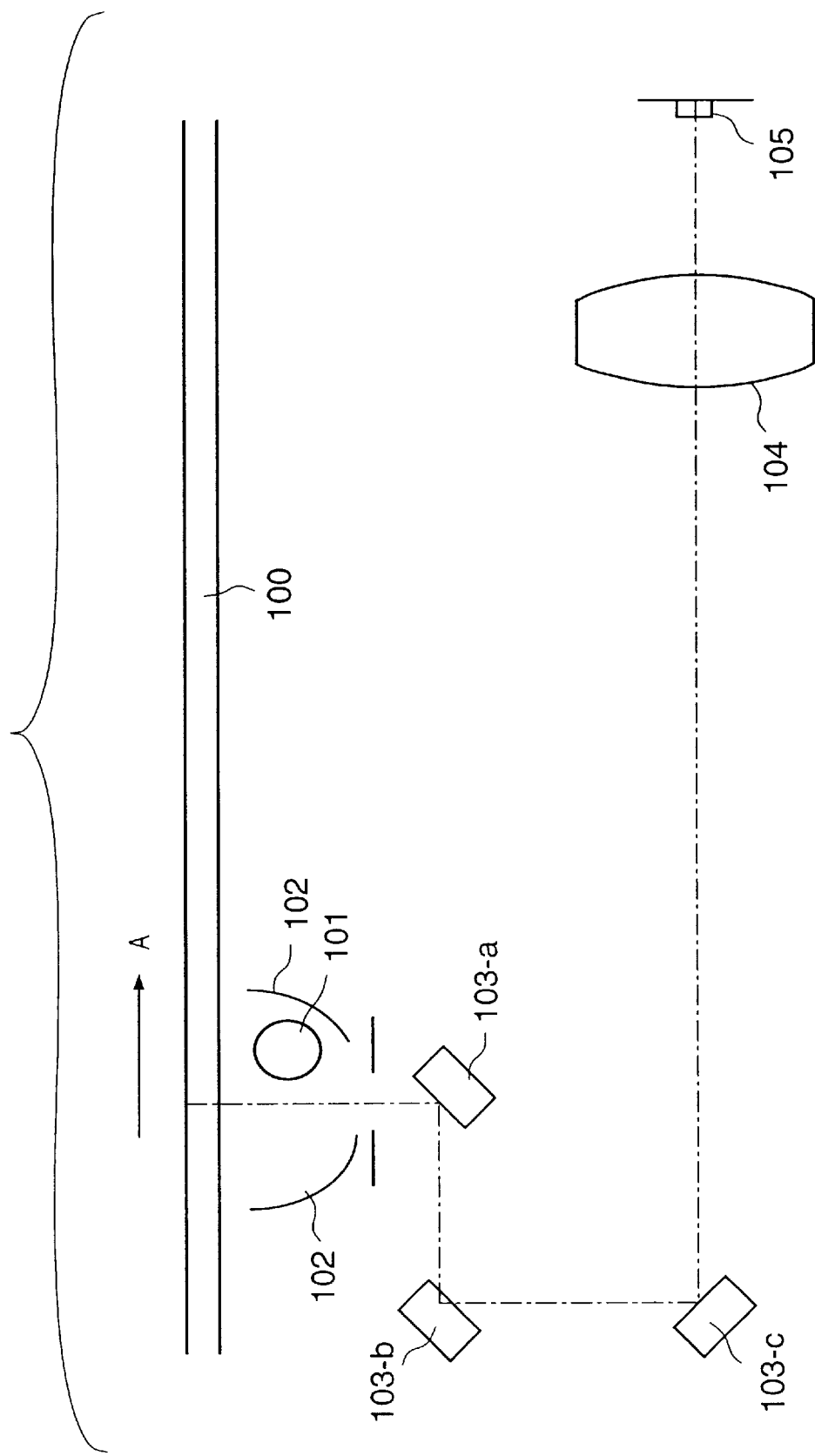
FIG. 21 describes a schematic configuration of an optical system in a conventional image reading apparatus.

FIG. 20 shows variations in the duty cycle during a continuous scan operation. As shown in FIG. 20, except for the beginning of the continuous operation, the duty cycle almost does not vary between the consecutive scan operations but gradually varies over a longtime range. Thus, during a continuous scan operation, it is efficient that the amount of delay is updated after each scan operation until a predetermined number (for example, 20) of originals are scanned, and thereafter, updated at intervals of a predetermined number of scan operations.

According to the fifth embodiment, prior to the start of a continuous scan operation, the value of the number of scan operations R1, which will be described below, is initialized to M1 (for example, 1) at step S55. Subsequently, the CPU 17 reads the duty cycle at intervals of a predetermined time (according to this embodiment, about 0.1 second) and stores these values in the memory (not shown) (steps S56 and S57). Thereafter, in step S58, whether or not a predetermined number (R1) of scan operations have been carried out since the last averaging of the duty cycle is determined. If so (NO in step S58), the process advances to step S62, and otherwise (YES in step S58), advances to step S59 where the mean of the held duty cycles is calculated and the values P1, P2 are updated and held based on this mean (step S60). At step S61, the entire memory is cleared.

Subsequently, step in S62, whether or not the reading operation is to be further continued is determined, and if so, in step 63, whether or not a predetermined number (R2; for example, 20) or more of scan operations have been carried out since the start of the reading operation is determined. If the number of scan operation executed is less than the predetermined number R2 (NO in step S63), the predetermined number R1 of scan operations to another predetermined number (according to the fifth embodiment, 1 in step S64). The process then returns to step S56 to repeat the above operations. In addition, if it is determined in step S63, that the number of scan operations executed is the predetermined number R2 or more (YES in step S63), the predetermined number R1 is set to yet another predetermined number M2 (according to the fifth embodiment, 10) that is larger than M1. The process returns to step S56 to repeat the above operations.

When the RTOP signal is provided during this continuous scan operation, the CPU 17 determines at step S45 in FIG. 14 whether or not the held values P1, P2 have been updated, and if so (YES in step S45), the CPU 17 sets the values P1, P2 in the first and second registers 51 and 52 to update the amount of delay (step S46 in FIG. 14).

Although in the above description, the number R1 of scan operations set at step S55 is the same as the number R1 set at step S64, different numbers may be set at the respective steps.

Based on such a control, during a continuous scan operation, the duty cycle is sampled at intervals of a predetermined time (for example, 0.1 second), the data is accumulated, the mean is calculated at intervals of a predetermined number of scan operations (for example, after each scan operation up to the 20th scan operation and every 10 scan operations after the 20th scan operation) and the values P1, P2 to be set in the first and second registers 51, 52 are recalculated and held.

Before extinguishing the fluorescent lamp, the CPU 17 reads the count value of the above timer to calculate the current lighting time, adds this value to the accumulated lighting time, and stores the resultant value in the memory.

In addition, although the values P1 and P2 set in the registers 51 and 52 are calculated from the mean of a plurality of detected data on the quantity of light in the fifth embodiment, the present invention is not limited to this aspect and the values P1 and P2 may be based on another statistical amount such as the median or mode of a plurality of detected data on the quantity of light.

Thus, despite the variation of the duty cycle, the center of the lighting control signal is not temporally offset but constantly aligns with the center of the Hsync period; thereby the barycenter of the quantity of light is situated close to the center of the Hsync period. Further, the effect of the quantity of light due to afterglow during the non-lighting period is substantially averaged for before and after the lighting period of one accumulation time period. Accordingly, even if the phosphor has different afterglow properties for different colors, the offset of the barycenter can be reduced to a very small value to minimize the color deviation during reads in the sub-scanning direction.

Variation 1 of the Fifth Embodiment

In the fifth embodiment, the mean is calculated at intervals of the predetermined number R1 of scans (for example, after each scan operation up to the 20th scan operation and every 10 scan operations after the 20th scan operation), however, the predetermined number may vary depending on the size of the original. In such a case, the mean is calculated at predetermined time intervals independent of the size of the original.

For example, control is provided such that for originals of the A3 size, the mean is calculated after each scan up to the 20th scan operation and every 10 scan operations after the 20th scan operation, as described above, and for originals of the A4 size, the mean is calculated every 2 scan operations up to the 40th scan operation and every 20 scan operations after the 40th scan operation.

This control enables the variation of the duty cycle to be more efficiently accommodated.

Variation 2 of the Fifth Embodiment

In the above fifth embodiment, updating is executed each time after scanning predetermined number of sheets, however, the amount of delay may be recalculated and updated upon changing of the original if the image reading apparatus has a document feeder (DF).

This control eliminates the necessity of counting a predetermined number of scans.

Variation 3 of the Fifth Embodiment)

The duty cycle during continuous scans varies with the accumulated lighting time of the fluorescent lamp as shown in FIG. 12. The variation tends to be larger as the duty cycle becomes higher (that is, the accumulated lighting time becomes longer).

Thus, the predetermined number R1 is varied depending on the duty cycle immediately after lighting. For example, if the duty cycle is 40% or less immediately after lighting, the amount of delay is recalculated and updated after each scan operation up to the 20th scan operation and every 10 scan operations after the 20th scan operation. If the duty cycle is equal or greater than 40%, the amount of delay is recalculated and updated after each scan up to the 40th scan operation and every 5 scan operations after the 40th scan operation.

The present invention is not limited to the above embodiments, and various changes and modifications can be made within the spirit and scope of the present invention. Therefore, to apprise the public of the scope of the present invention, the following claims are made.

What is claimed is:

1. An image reading apparatus for forming an image of an original on a plurality of line sensors via an image-forming optical system to read the image, comprising:

a white light source for irradiating the original with light, said light source having different afterglow properties for different colors corresponding to a plurality of read colors of said plurality of line sensors;

control value determining means for determining, based on a quantity of light from said white light source, a control value for said white light source at a predetermined timing so that a barycenter of the quantity of light in the direction of a time axis in one charge accumulation time period almost aligns with the center of the one charge accumulation time period; and light source control means for controlling said white light source based on the control value determined by said control value determining means.

2. The image reading apparatus according to claim 1, wherein said control value determining means updates the control value for said white light source after each scan operation.

3. The image reading apparatus according to claim 2, further comprising a sensor for measuring the quantity of light from said white light source, wherein said control value determining means determines the control value for said white light source for the N-th scan operation based on data on the quantity of light measured by said sensor up to the (N−1)-th scan operation.

4. The image reading apparatus according to claim 1, further comprising a sensor for measuring the quantity of light from said white light source, wherein said control value determining means determines the control value for said white light source each time after a predetermined number of scan operations based on data on the quantity of light measured by said sensor from a start of the scan operation through a last scan operation.

5. The image reading apparatus according to claim 1, wherein said control value determining means updates the control value for said white light source, each time the quantity of light from said white light source has been sampled a predetermined number of times.

6. The image reading apparatus according to claim 1, further comprising shading correction value setting means for executing a shading measurement and setting a shading correction value, wherein said control value determining means updates the control value for said white light source each time said shading correction value setting means performs a shading measurement operation.

7. The image reading apparatus according to claim 1, further comprising accumulated time measuring means for measuring and holding accumulated lighting time of said white light source, wherein when a first image is read after the period in which said white light source is extinguished, said control value determining means determines the control value for said white light based on the accumulated lighting time of said white light source held by said accumulated time measuring means.

8. The image reading apparatus according to claim 1, further comprising count means for counting the number of image reading processings executed, wherein said control value determining means updates the control value for said white light source each time said count means has counted a predetermined number of image reading processings.

9. The image reading apparatus according to claim 8, wherein said predetermined number is varied depending on the number of image reading processings counted by said count means.

10. The image reading apparatus according to claim 9, wherein said predetermined number is increased if the number of image reading processings counted by said count means exceeds a predetermined value.

11. The image reading apparatus according to claim 8, wherein said predetermined number is varied depending on the length of the irradiation time of said white light source in said one charge accumulation time period.

12. The image reading apparatus according to claim 11, wherein said predetermined number is increased with the increasing length of the irradiation time of said white light source in said one charge accumulation time period.

13. The image reading apparatus according to claim 8, wherein said predetermined number is varied depending on the size of the original.

14. The image reading apparatus according to claim 1, further comprising a document changing device, wherein said control value determining means updates the control value for said white light source each time the original on said document changing device is changed.

15. The image reading apparatus according to claim 1, wherein said light source control means controls said light source using pulse width modulation and wherein said control value determining means determines the control value for said white light source so that a control pulse is symmetrical about a center of said one accumulation time period in each accumulation time period.

16. The image reading apparatus according to claim 15, wherein said control value determining means determines the control value for said white light source so that the center of the pulse width of the control pulse that lights said white light source aligns with the center of said one accumulation time period.

17. The image reading apparatus according to claim 15, wherein said control value determining means determines the control value for said white light source so that the center of the pulse width of the control pulse that lights said white light source aligns with a start of said one accumulation time period.

18. The image reading apparatus according to claim 1, wherein the control value determined by said control value determining means includes a phase value of a pulse width modulation signal of the control pulse.

19. The image reading apparatus according to claim 1, wherein said white light source has a plurality of types of phosphors having different afterglow properties.

20. An image reading apparatus for forming an image of an original on a plurality of line sensors via an image-forming optical system to read the image, comprising:

a white light source for irradiating the original with light, said light source having different afterglow properties for different colors corresponding to a plurality of read colors of said plurality of line sensors;

a sensor for measuring a quantity of light from said white light source;

control value determining means for determining, based on the statistical amount of the quantity of light from said white light source measured by said sensor, a control value for said white light source so that a barycenter of the quantity of light in the direction of a time axis in one charge accumulation time period almost aligns with the center of the one charge accumulation time period; and light source control means for controlling said white light source based on the control value determined by said control value determining means.

21. The image reading apparatus according to claim 20, wherein said statistical amount is the mean, median, or mode of the quantity of light from said white light source obtained by a plurality of measurements carried out by said sensor.

22. The image reading apparatus according to claim 20, wherein said control value determining means determines the control value for said white light source for the N-th scan operation based on the statistical amount of the quantity of light measured by said sensor up to the (N−1)-th scan operation.

23. The image reading apparatus according to claim 20, wherein said control value determining means determines the control value for said white light source each time after a predetermined number of scan operations based on the statistical amount of the quantity of light measured by said sensor from a start of the scan operation through a last scan operation.

24. The image reading apparatus according to claim 20, wherein said control value determining means updates the control value for said white light source based on the statistical amount of the quantity of light from said white light source each time said sensor has sampled the quantity of light a predetermined number of times.

25. The image reading apparatus according to claim 20, further comprising count means for counting the number of image reading processings executed, wherein said control value determining means updates the control value for said white light source, based on the statistical amount of the quantity of light obtained through a predetermined number of image reading processings counted by said count means.

26. The image reading apparatus according to claim 20, wherein said light source control means controls said light source using pulse width modulation and wherein said control value determining means determines the control value for said white light source so that a control pulse is symmetrical about a center of said one accumulation time period in each accumulation time period.

27. The image reading apparatus according to claim 26, wherein said control value determining means determines the control value for said white light source so that the center of the pulse width of the control pulse that lights said white light source aligns with the center of said one accumulation time period.

28. The image reading apparatus according to claim 26, wherein said control value determining means determines the control value for said white light source so that the center of the pulse width of the control pulse that lights said white light source aligns with a start of said one accumulation time period.

29. The image reading apparatus according to claim 20, wherein the control value determined by said control value determining means includes a phase value of a pulse width modulation signal of a control pulse.

30. The image reading apparatus according to claim 20, wherein said white light source has a plurality of types of phosphors having different afterglow properties.

31. A method for controlling an image reading apparatus comprising a white light source for irradiating an original with light, said light source having different afterglow properties for different colors corresponding to a plurality of read colors of a plurality of line sensors, said image reading apparatus forming an image of the original irradiated in said white light-source on the plurality of line sensors via an image-forming optical system to read the image, said method comprising:
  a control value determining step of determining a control value for said white light source at a predetermined timing on the basis of the quantity of light from said white light source so that a barycenter of the quantity of light in a direction of a time axis in one charge accumulation time period almost aligns with the center of the one charge accumulation time period; and
  a light source control step of controlling said white light source based on the control value determined in said control value determining step.

32. The control method according to claim 31, wherein in said control value determining step, the control value for said white light source is updated after each scan operation.

33. The control method according to claim 32, further comprising a step of measuring the quantity of light from said white light source, wherein, in said control value determining step, the control value for said white light source for the N-th scan operation is determined based on data on the quantity of light measured up to the N−1th scan.

34. The control method according to claim 31, further comprising a step of measuring the quantity of light from said white light source, wherein, in said control value determining step, the control value for said white light source is determined each time after a predetermined number of scans based on data on the quantity of light measured from a start of the scan operation through a last scan.

35. The control method according to claim 31, wherein, in said control value determining step, the control value for said white light source is updated each time the quantity of light from said white light source has been sampled a predetermined number of times.

36. The control method according to claim 31, further comprising a shading correction value setting step of executing a shading measurement and setting a shading correction value, wherein, in said control value determining step, the control value that controls said white light source is updated each time a shading measuring operation is performed in said shading correction value setting step.

37. The control method according to claim 31, further comprising an accumulated time measuring step of measuring and holding the accumulated lighting time of said white light source, wherein when a first image is read after the period in which said white light source is extinguished in said control value determining step, the control value for said white light is determined based on the accumulated lighting time of said white light source held in said accumulated time measuring step.

38. The control method according to claim 31, further comprising a count step of counting the number of image reading processings executed, wherein, in said control value determining step, the control value for said white light source is updated each time a predetermined number of image reading processings has counted in said count step.

39. The control method according to claim 38, wherein said predetermined number is varied depending on the number of image reading processings counted in said count step.

40. The control method according to claim 39, wherein said predetermined-number is increased if the number of image reading processings counted in said count step exceeds a predetermined value.

41. The control method according to claim 38, wherein said predetermined number is varied depending on the length of the irradiation time of said white light source in said one charge accumulation time period.

42. The control method according to claim 41, wherein said predetermined number is increased with the increasing length of the irradiation time of said white light source in said one charge accumulation time period.

43. The control method according to claim 38, wherein said predetermined number is varied depending on the size of the original.

44. The control method according to claim 31, wherein said image reading apparatus further comprises a document changing device, and
  in said control value determining step, the control value that controls said white light source is updated each time the original on said document changing device is changed.

45. The control method according to claim 31, wherein, in said light source control step, said light source is controlled using pulse width modulation and wherein in said control value determining step, the control value for said white light source is determined so that a control pulse is symmetrical about a center of said one accumulation time period in each accumulation time period.

46. The control method according to claim 45, wherein, in said control value determining step, the control value for said white light source is determined so that the center of the pulse width of the control pulse that lights said white light source aligns with the center of said one accumulation time period.

47. The control method according to claim 45, wherein, in said control value determining step, the control value for said white light source is determined so that the center of the pulse width of the control pulse that lights said white light source aligns with a start of said one accumulation time period.

48. The control method according to claim 31, wherein the control value determined in said control value determining step includes a phase value of a pulse width modulation signal of a control pulse.

49. The control method according to claim 31, wherein said white light source has a plurality of types of phosphors having different afterglow properties.

50. A method for controlling an image reading apparatus having a white light source for irradiating an original with light, said light source having different afterglow properties for different colors corresponding to a plurality of read colors of a plurality of line sensors, said image reading apparatus forming an image of the original irradiated in said white light source on the plurality of line sensors via an image-forming optical system to read the image, said method comprising:

a measuring step of measuring the quantity of light from said white light source;

a control value determining step of determining a control value for said white light source at a predetermined timing on the basis of the statistical amount of the quantity of light from said white light source measured in said measuring step so that the barycenter of the quantity of light in a direction of a time axis in one charge accumulation time period almost aligns with the center of the one charge accumulation time period; and a light source control step of controlling said white light source based on the control value determined in said control value determining step.

51. The control method according to claim 50, wherein said statistical amount is the mean, median, or mode of the quantity of light from said white light source obtained by a plurality of measurements carried out in said measuring step.

52. The control method according to claim 50, wherein, in said control value determining step, the control value for said white light source for the N-th scan operation is determined based on the statistical amount of the quantity of light measured in said measuring step up to the (N−1)-th scan operation.

53. The control method according to claim 50, wherein, in said control value determining step, the control value for said white light source is determined each time after a predetermined number of scan operations based on the statistical amount of the quantity of light measured in said measuring step from a start of the scan operation through a last scan operation.

54. The control method according to claim 50, wherein, in said control value determining step, the control value for said white light source is updated based on the statistical amount of the quantity of light from said white light source each time the quantity of light has sampled a predetermined number of times in said measuring step.

55. The control method according to claim 50, further comprising a count step of counting the number of image reading processings executed, wherein, in said control value determining step, the control value for said white light source is updated based on the statistical amount of the quantity of light obtained through a predetermined number of image reading processings counted in said count step.

56. The control method according to claim 50, wherein, in said light source control step, said light source is controlled using pulse width modulation and wherein, in said control value determining step, the control value for said white light source is determined so that a control pulse is symmetrical about a center of said one accumulation time period in each accumulation time period.

57. The control method according to claim 56, wherein, in said control value determining step, the control value for said white light source is determined so that the center of the pulse width of the control pulse that lights said white light source aligns with a center of said one accumulation time period.

58. The control method according to claim 56, wherein, in said control value determining step, the control value for said white light source is determined so that the center of the pulse width of the control pulse for said white light source aligns with a start of said one accumulation time period.

59. The control method according to claim 50, wherein the control value determined in said control value determining step includes a phase value of a pulse width modulation signal of a control pulse.

60. The control method according to claim 50, wherein said white light source has a plurality of types of phosphors having different afterglow properties.

* * * * *